(12) United States Patent
Cyzen

(10) Patent No.: US 11,697,525 B2
(45) Date of Patent: Jul. 11, 2023

(54) REMOVABLE COLLECTION CONTAINER SYSTEM FOR A WORK SURFACE

(71) Applicant: Keith Cyzen, Glen Ellyn, IL (US)

(72) Inventor: Keith Cyzen, Glen Ellyn, IL (US)

( * ) Notice: Subject to any disclaimer, the term of this patent is extended or adjusted under 35 U.S.C. 154(b) by 0 days.

(21) Appl. No.: 16/586,413

(22) Filed: Sep. 27, 2019

(65) Prior Publication Data

US 2020/0102119 A1   Apr. 2, 2020

Related U.S. Application Data

(60) Provisional application No. 62/836,284, filed on Apr. 19, 2019, provisional application No. 62/738,638, filed on Sep. 28, 2018.

(51) Int. Cl.
   *B65D 25/22*   (2006.01)
   *B65D 21/02*   (2006.01)

(52) U.S. Cl.
   CPC .......... *B65D 25/22* (2013.01); *B65D 21/0233* (2013.01)

(58) Field of Classification Search
   CPC ........ B65D 25/22; B65D 25/24; B65D 25/20; B65D 21/0233; B65F 1/141; B65F 2210/18
   See application file for complete search history.

(56) References Cited

U.S. PATENT DOCUMENTS

| | | |
|---|---|---|
| 2,800,823 A | 7/1957 | Tugend |
| 2,895,469 A | 7/1959 | Regley |
| 4,505,011 A | 3/1985 | Dupuy |
| 4,796,616 A | 1/1989 | Panahpour |
| 4,854,016 A | 8/1989 | Rice |
| 5,802,743 A | 9/1998 | Chien |
| D413,985 S | 9/1999 | Martin et al. |
| 5,996,983 A | 12/1999 | Laurenzi |
| 6,007,501 A | 12/1999 | Cabados et al. |

(Continued)

FOREIGN PATENT DOCUMENTS

| | | |
|---|---|---|
| CN | 92201178 U | 12/1992 |
| EP | 1974636 A1 | 10/2008 |
| WO | WO-2012/036596 A1 | 3/2012 |

OTHER PUBLICATIONS

International Application No. PCT/US2019/053610, International Search Report and Written Opinion, dated Jan. 15, 2020.

(Continued)

*Primary Examiner* — Javier A Pagan
(74) *Attorney, Agent, or Firm* — Hunton Andrews Kurth LLP

(57) ABSTRACT

A collection system for removable attachment to a work surface includes a container portion having an interior defined by a bottom wall, a front wall, a back wall, and first and second sidewalls. The first and second sidewalls each including a first portion of a securement mechanism. The collection system also includes a first and second clamp arm assemblies that are configured to releasably attach to the first and second side walls, respectively. Each of the first and second clamp arm assemblies includes an upper clamp arm, a wall portion coupled to and extending downwardly from the first upper clamp arm, a lower clamp arm coupled to the wall portion, and a second portion of the securement mechanism that is configured to releasably engage the first portion of the securement mechanism.

7 Claims, 21 Drawing Sheets

(56) References Cited

U.S. PATENT DOCUMENTS

| | | | |
|---|---|---|---|
| 6,026,972 A | 2/2000 | Makowski | |
| 6,382,608 B1 * | 5/2002 | Michell | B25B 1/06 269/170 |
| 6,578,837 B1 | 6/2003 | Blank et al. | |
| 6,899,243 B1 | 5/2005 | Gotesson | |
| 6,910,429 B1 | 6/2005 | Matay et al. | |
| 6,978,704 B2 | 12/2005 | Cheng | |
| 7,007,931 B2 | 3/2006 | Tobinai | |
| 7,104,166 B1 | 9/2006 | Wong | |
| 7,216,862 B2 | 5/2007 | Walsh | |
| 7,326,428 B2 * | 2/2008 | Weir | A47J 47/10 220/23.88 |
| 7,712,731 B2 | 5/2010 | Candiff | |
| 7,735,813 B2 | 6/2010 | Geier et al. | |
| 7,815,175 B2 | 10/2010 | Cicenas et al. | |
| 7,896,322 B2 | 3/2011 | Geler et al. | |
| 7,942,392 B2 | 5/2011 | Geier et al. | |
| 7,954,794 B2 | 6/2011 | Fuller et al. | |
| 8,028,560 B2 | 10/2011 | Badiali | |
| 8,074,340 B2 | 12/2011 | Cicenas et al. | |
| 8,251,357 B2 | 8/2012 | Young | |
| 8,360,407 B2 | 1/2013 | Kent | |
| 8,430,383 B2 | 4/2013 | Strauss | |
| 8,584,888 B2 | 11/2013 | Buerk | |
| 8,740,208 B2 | 6/2014 | Hagan et al. | |
| 8,763,998 B1 | 7/2014 | Worstell | |
| 8,770,531 B2 | 7/2014 | Cundy | |
| 8,882,093 B2 | 11/2014 | Kuo | |
| 9,032,882 B1 | 5/2015 | Richardson | |
| 9,049,963 B2 | 6/2015 | Young | |
| 9,066,626 B2 | 6/2015 | Young | |
| 9,089,208 B2 | 7/2015 | Zimmerman | |
| 9,096,350 B2 | 8/2015 | Buerk | |
| 9,113,725 B1 * | 8/2015 | Nipp | A47F 5/0068 |
| 9,321,168 B2 | 4/2016 | Brassette | |
| 9,452,882 B2 | 9/2016 | Buerk | |
| 9,522,456 B2 | 12/2016 | Cicenas et al. | |
| 9,751,193 B2 * | 9/2017 | Evatt | B25B 5/068 |
| D821,594 S | 6/2018 | Davidson | |
| 10,144,116 B2 | 12/2018 | Bartl | |
| 10,196,202 B1 | 2/2019 | Clavizzao | |
| 2004/0153012 A1 | 8/2004 | Schroeder | |
| 2005/0056746 A1 | 3/2005 | Landver | |
| 2005/0279749 A1 | 12/2005 | Karrasch et al. | |
| 2006/0016953 A1 | 1/2006 | Beck et al. | |
| 2007/0055187 A1 | 3/2007 | Magnone et al. | |
| 2008/0029944 A1 | 2/2008 | Avalani | |
| 2010/0016768 A1 | 1/2010 | Liu | |
| 2010/0163702 A1 | 7/2010 | Lagobi | |
| 2011/0232536 A1 | 9/2011 | Moravec et al. | |
| 2012/0089058 A1 | 4/2012 | Ellis | |
| 2014/0203033 A1 | 7/2014 | Schmidt et al. | |
| 2015/0223526 A1 | 8/2015 | Nolan | |
| 2015/0336740 A1 * | 11/2015 | Buerk | B65D 25/20 220/636 |
| 2018/0320719 A1 | 11/2018 | Swan | |

OTHER PUBLICATIONS

Cup Board Pro—As Seen on Shark Tank—Made in U.S.A., downloaded from the Internet at: <Cup Board Pro—As Seen on Shark Tank—Made in U.S.A.> (2010).

* cited by examiner

REMOVABLE COLLECTION CONTAINER SYSTEM FOR A WORK SURFACE

CROSS-REFERENCE TO RELATED APPLICATION

This application claims the benefit of the filing date of U.S. Provisional Application No. 62/738,638, filed Sep. 28, 2018, and U.S. Provisional Application No. 62/836,284, filed Apr. 19, 2019, the disclosures of which are hereby incorporated by references in their entirety.

FIELD OF THE DISCLOSURE

The present disclosure generally relates to containers and, in particular, container systems for collecting material from a work surface.

BACKGROUND

Meal preparation often involves a cutting board, multiple bowls, or other dishes, and various food items necessary for the meal. Once the various food items are cut, sliced, and diced into desired portions, the food items can be placed in their respective bowls until later combined. For example, edible food could be placed in one set of bowls while scraps and other food waste could be placed in another set of bowls. However, counter space can be limited and even counters with ample space soon become overcrowded when multiple sets of bowls, cutting boards, and various food items are placed on the counter.

Similarly, working in an industrial space, such as a garage, a warehouse, a machine shop, etc., typically involves large machinery, open floor plans, and very few surfaces to place tools, devices, or parts. The shortage of work surfaces, or simply flat, unobstructed surfaces, in such locations may lead to parts and tools going missing more frequently because those parts and tools do not have a surface onto which they could be safely and securely placed. Moreover, work surfaces in industrial spaces can often be used for tasks that create a lot of debris further limiting available space.

SUMMARY

A collection system for removable attachment to a worktop is disclosed herein. The collection system includes, in a version, a container portion having an interior defined by a bottom wall, a front wall, a back wall, a first side wall, a second side wall, and a lip that extends around a top edge of the container portion. The collection system also includes a first clamp arm assembly carried by the first side wall and a second clamp arm assembly carried by the second side wall. Each of the first and second clamp arm assemblies includes an upper clamp arm, a housing coupled to and extending below the upper clamp arm, a lower clamp arm partially disposed within the housing, and an advancement mechanism coupled to the lower clamp arm and the housing, and configured to translate the lower clamp arm toward the upper clamp arm.

In another version, the collection system for removable attachment to a work surface includes a container portion having an interior defined by a bottom wall, a front wall, a back wall, and first and second side walls. The first and second sidewalls each includes a first portion of a securement mechanism. The collection system also includes first and second clamp arm assemblies that are configured to releasably attach to the first and second side walls, respectively. Each of the first and second clamp arm assemblies includes an upper clamp arm, a wall portion coupled to and extending downwardly from the upper clamp arm, a lower clamp arm coupled to the wall portion, and a second portion of the securement mechanism that is configured to releasably engage the first portion of the securement mechanism.

In yet another version, the collection system for removable attachment to a work surface includes a container portion having an interior defined by a bottom wall, a front wall, a back wall, a first side wall, and a second side wall. The container portion also includes first and second clamp arm assemblies that are coupled to the first and second side walls of the container portion, respectively. Each of the first and second clamp arm assemblies includes an upper clamp arm configured to engage a worktop of the work surface; and a locking assembly configured to engage a lower surface of the worktop. The locking mechanism includes a handle, a jaw having a worktop engagement end, an adjustable link, and a linkage release arm. The handle is pivotably coupled to the jaw at a first pivot, the adjustable link is pivotably coupled to the handle at a second pivot, and the linkage release arm is pivotably coupled to the handle at a third pivot.

In another version, the collection system for removable attachment to a work surface includes a container portion having an angled front wall, a back wall that is taller relative to the front wall, and opposite first and second lateral sides defining a receiving volume. The collection system also includes first and second clamp arm assemblies disposed at the first and second lateral sides of the container, respectively. Each of the first and second clamp arm assemblies includes an upper clamp arm and a lower clamp arm configured to move toward the upper clamp arm. Each clamp arm assembly further includes a force generating element configured to bias the lower clamp arm toward the upper clamp arm and to selectively secure the collection container to the work surface.

In yet another version, a kit for a collection system for removable attachment to a worktop includes first and second clamp arm assemblies each having an upper clamp arm, a wall portion coupled to and extending downwardly from the upper clamp arm, a lower clamp arm coupled to the wall portion, and a first portion of a securement mechanism that is configured to receive a second portion of the securement mechanism to couple the respective first or second clamp arm assemblies to a container portion.

BRIEF DESCRIPTION OF THE DRAWINGS

The present disclosure may be best understood by reference to the following description taken in conjunction with the accompanying drawings, in which like reference numerals identify like elements in the several figures, in which.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help improve an understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
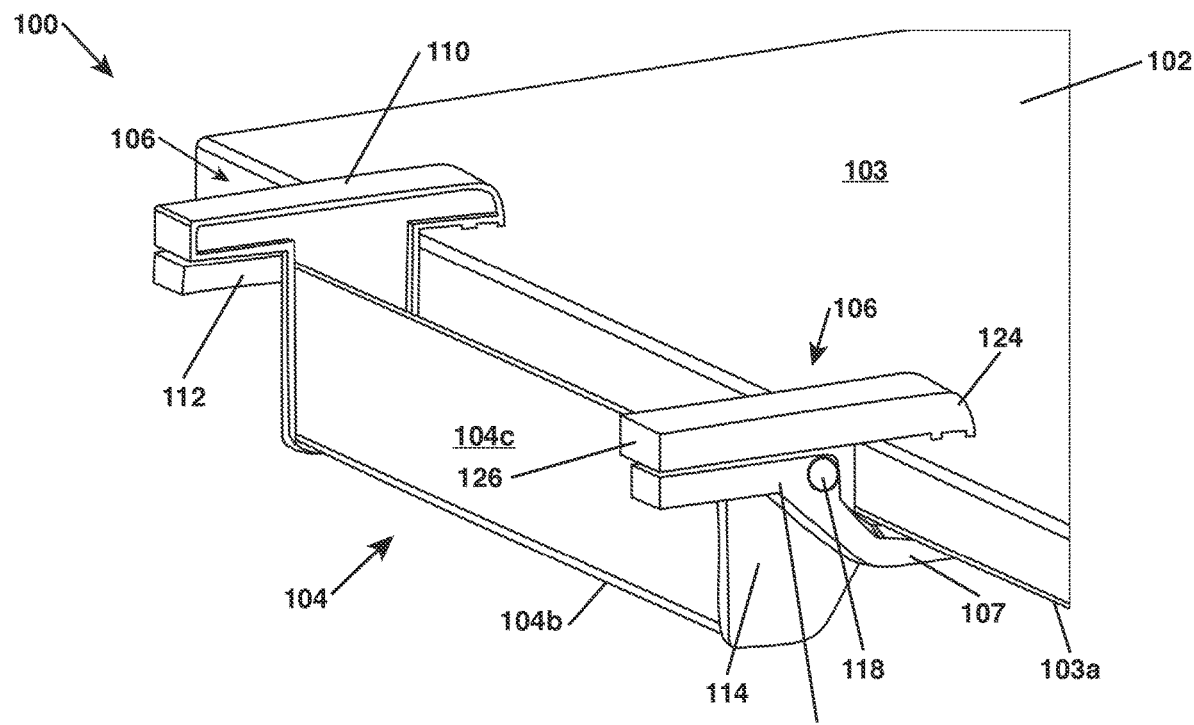
FIG. 1 is a perspective view of one embodiment of a collection container system, constructed in accordance with the principles of the present disclosure, removably attached to a work surface.
Figure 2:
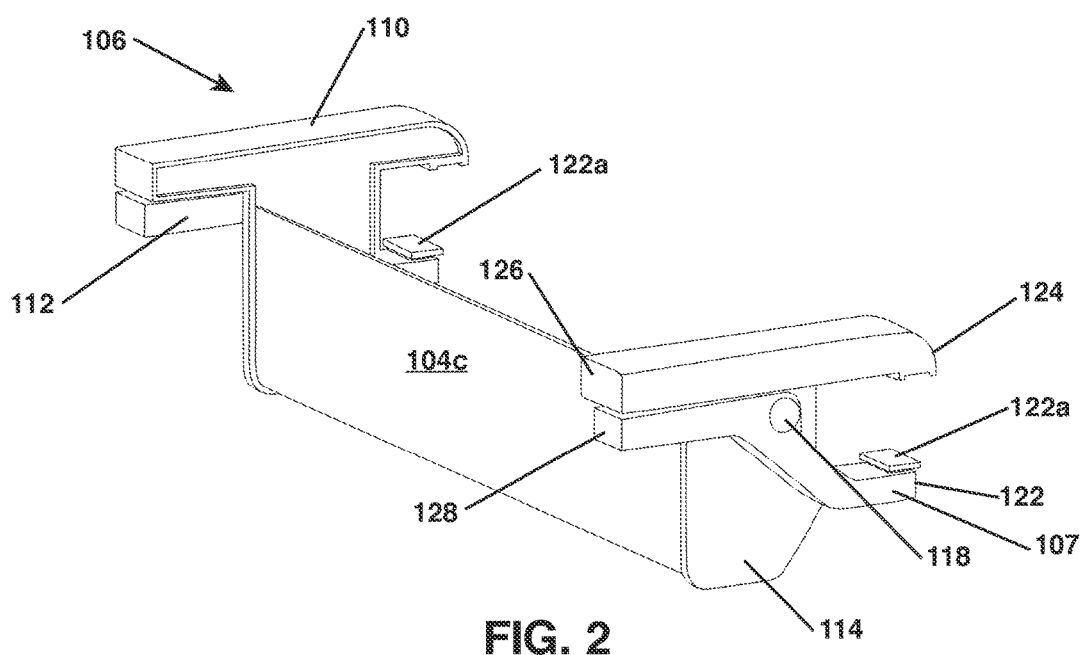
FIG. 2 is a first perspective view of the collection container system of FIG. 1.

The present disclosure is directed to a collection container system 100, as depicted, for example, in FIGS. 1-41. FIG. 1 illustrates one such container system 100 removably secured to an edge of a work surface 102. The system 100 includes a container portion 104 and first and second clamp arm assemblies 106. In one application, the system 100 is designed and configured to enable easy collection of debris, garbage, food scraps, prepared foods, etc., off of a worktop 103 of the work surface 102, which will be understood to include any structure, equipment, or furniture, including a kitchen counter, a work bench, a table, a desk, a shelf, etc., and into the container portion 104. In other applications, the container portion 104 can be considered a food storage device which can similarly be used to contain food items for temporary storage during food prep. For example, chopped vegetables, meats, etc., can easily be moved from the work surface 102 into the container portion 104 thereby cleaning the work surface 102 and making the work surface 102 available for other tasks.

Figure 3:
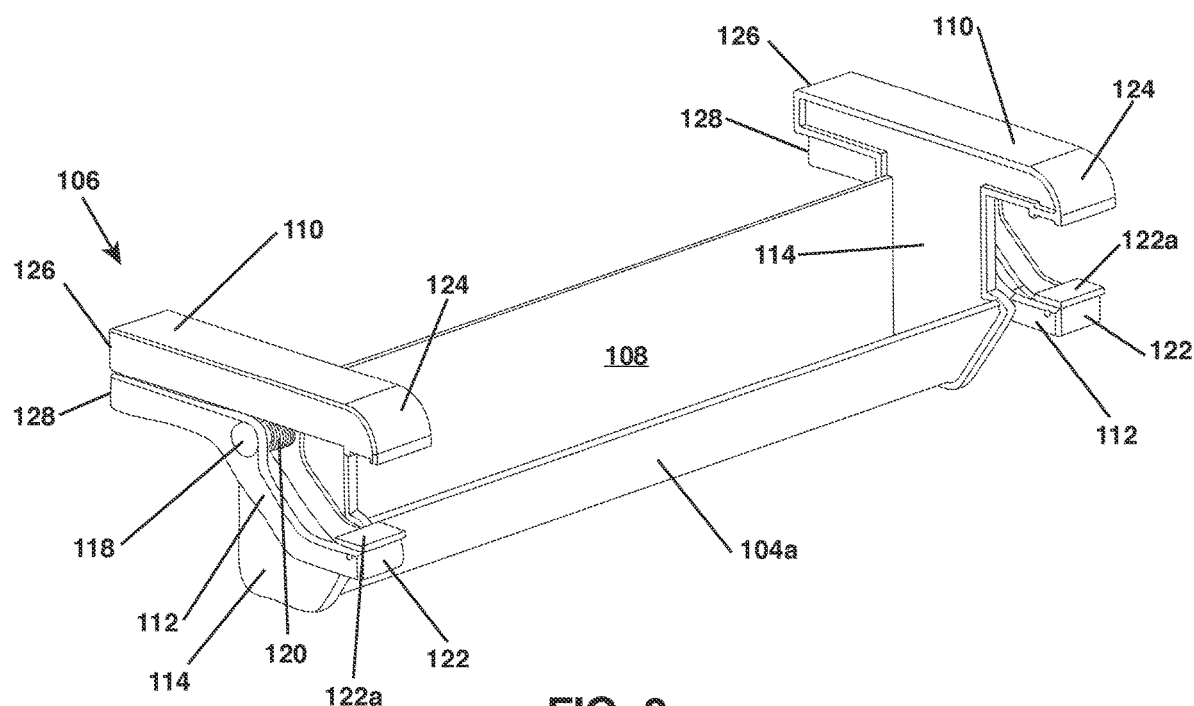
FIG. 3 is a second perspective view of the collection container system of FIG. 1.

The container portion 104 includes an elongated structure defining an internal receiving volume 108 (see, FIG. 3) similar to a gutter or trough, for example. The container portion 104 can have a front wall 104a, a bottom wall 104b, a rear wall 104c, and sidewalls 114 defining the receiving volume 108. The front wall 104a can have a height relatively lower than a height of the rear wall 104c such that when the system 100 is attached to the worktop 103, as depicted in FIG. 1, an upper edge of the front wall 104a is aligned with or disposed below the work surface 102, including being aligned with a lower surface 103a of the worktop 103, while the rear wall 104c extends upwardly so that an upper edge thereof is aligned with or higher than the work surface 102. The front wall 104a may be angled relative to vertical and away from the rear wall 104c, as depicted in FIG. 3. In other examples, however, the front wall 104a can be parallel to the rear wall 104c. In such an example, the bottom wall 104b can have a greater width, which may increase the overall storage capacity of the internal receiving volume 108.

The clamp arm assemblies 106 each includes an upper clamp arm 110 for selectively engaging the work surface 102 and a lower clamp arm 112 for selectively engaging the lower surface 103a of the worktop 103. In this version, the upper clamp arm 110 is fixedly mounted to or integral with the sidewall 114 of the container portion 104 and projects laterally outwardly therefrom. The lower clamp arm 112 is pivotably mounted to the sidewall 114 at a pivot 118. The clamp arm assemblies 106 can further include a foot 107 that projects forwardly below the lower clamp arm 112 to engage a structure underneath the worktop 103. Advantageously, by engaging the structure, the foot 107 can counteract any movement force acting on the clamp arm assemblies 106 due to the weight of the clamp arm assemblies 106, container portion 104, and any contents in the container portion 104.

Figure 4:
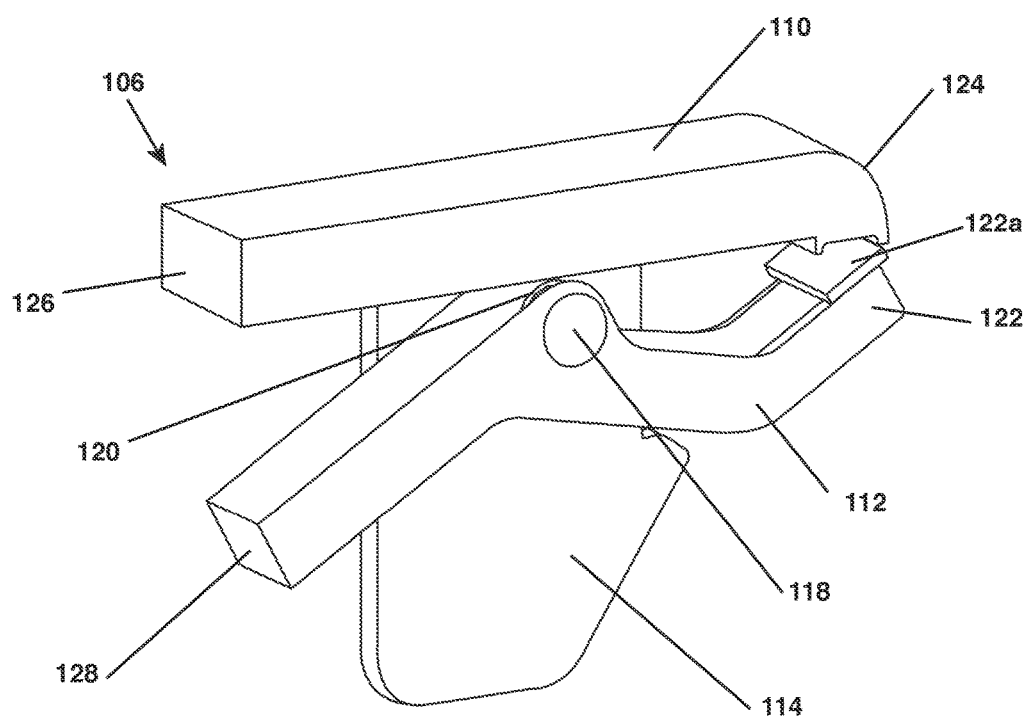
FIG. 4 is a perspective view of one version of a clamp arm assembly of the collection container system of FIG. 1, constructed in accordance with the principles of the present disclosure, showing the clamp arm in a biased closed configuration.
Figure 5:
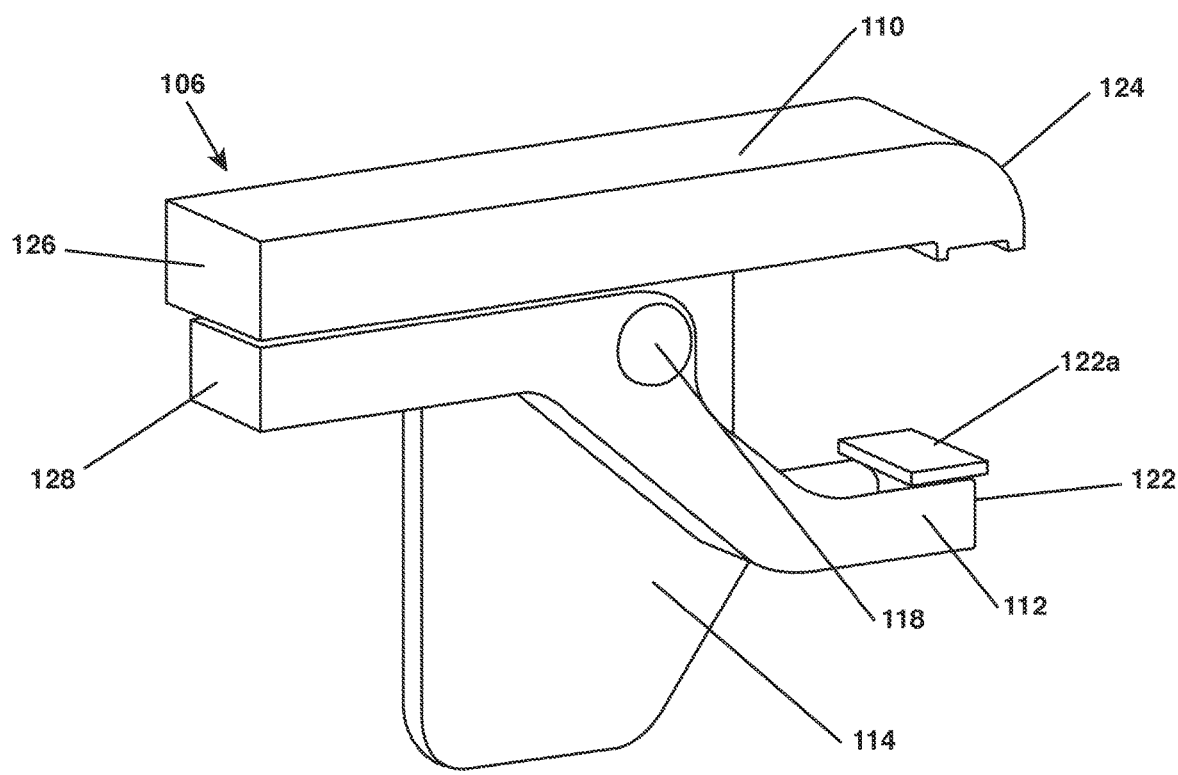
FIG. 5 is a perspective view of the clamp arm assembly of FIG. 4, showing the clamp arms in an open configuration.

As shown in FIGS. 3 and 4, each of the clamp arm assemblies 106 includes a force generating element 120 acting on at least the lower clamp arm 112 to bias a front end 122 of the lower clamp arm 112 toward a front end 124 of the upper clamp arm 110. As such, when mounted onto the worktop 103, as depicted in FIG. 1, the force generating element 120 secures the system 100 in position by causing the clamp arms 110, 112 to clamp onto the worktop 103 and engage the work surface 102 and lower surface 103a, respectively. In the depicted version, the force generating element 120 includes a torsion spring mounted around the pivot 118 with ends extending along and coupled to rear ends 126, 128 of the upper and lower clamp arms 110, 112, respectively. As shown in FIG. 4, in the absence of external forces acting on the upper and lower clamp arms 110, 112, the force generating element 120 causes the clamp arms 110, 112 to occupy a closed configuration where the front ends 122, 124 contact or are disposed closely adjacent to each other. Thus, in order to install or removably attach the system 100 to a work surface 102, a user can simply grasp the rear ends 126, 128 of the clamp arms 110, 112, which provide convenient handle portions for the clamp arms 110, 112, and apply a squeezing force to cause the lower clamp arm 112 to rotate about the pivot 118 and separate the front ends 122, 124 toward an open position, as illustrated in FIG. 5. Upon mounting the system 100 to the work surface 102 so that the front ends 122, 124 of the clamp arms 110, 112 project above and below the worktop 103, the squeezing force can be removed, and the force generating element 120 naturally biases the front ends 122, 124 of the arms 110, 112 together to grasp the work surface 102 and lower surface 103a, respectively. In some versions, the front ends 122 of the lower clamp arms 112 can include a pad 122a to increase a gripping area and engage the worktop 103 when in use. If desired, the pads 122a can be pivotably coupled to the lower clamp arms 112, so that the pads 122a can easily adjust to align with the lower surface 103a of the worktop 103. This allows the clamp arm assemblies 106 to easily transition between worktops 103 of varying thicknesses.

In one alternative version, the force generating element 120 can be a cam mechanism for selectively driving the front end 122, 124 of at least one of the clamp arms 110, 112 toward the other, thereby clamping the system 100 to the work surface 102. For example, one version of the cam mechanism can include a shaft being fixed to the front end 124 of the upper clamp arm 110 and extending down through the front end 122 of the lower clamp arm 112, where a female cam lever component is received on the end of the shaft. Manipulation of the cam lever would engage the front end 122 of the lower clamp arm 112 causing it to move toward the front end 124 of the upper clamp arm 110 and engage or clamp the worktop 103. In another alternative version, both clamp arms 110, 112 can be fixed in position but the front ends 122, 124 of one or both of the clamp arms 110, 112 include an expandable device, such as an inflatable membrane, which is selectively expandable to secure the system 100 to the worktop 103. In such a version, the inflatable membrane could be fluidly coupled to a small pumping device elsewhere on the system 100 for inflating the membrane to sufficient pressure to engage the worktop 103 and create a clamping force needed to retain the system 100 in position.

As described thus far, the force generating element 120 of the clamp arm assemblies 106 has been described and illustrated as a torsion spring. In other versions, however, the system 100 can implement different types of force generating elements.

Figure 6:
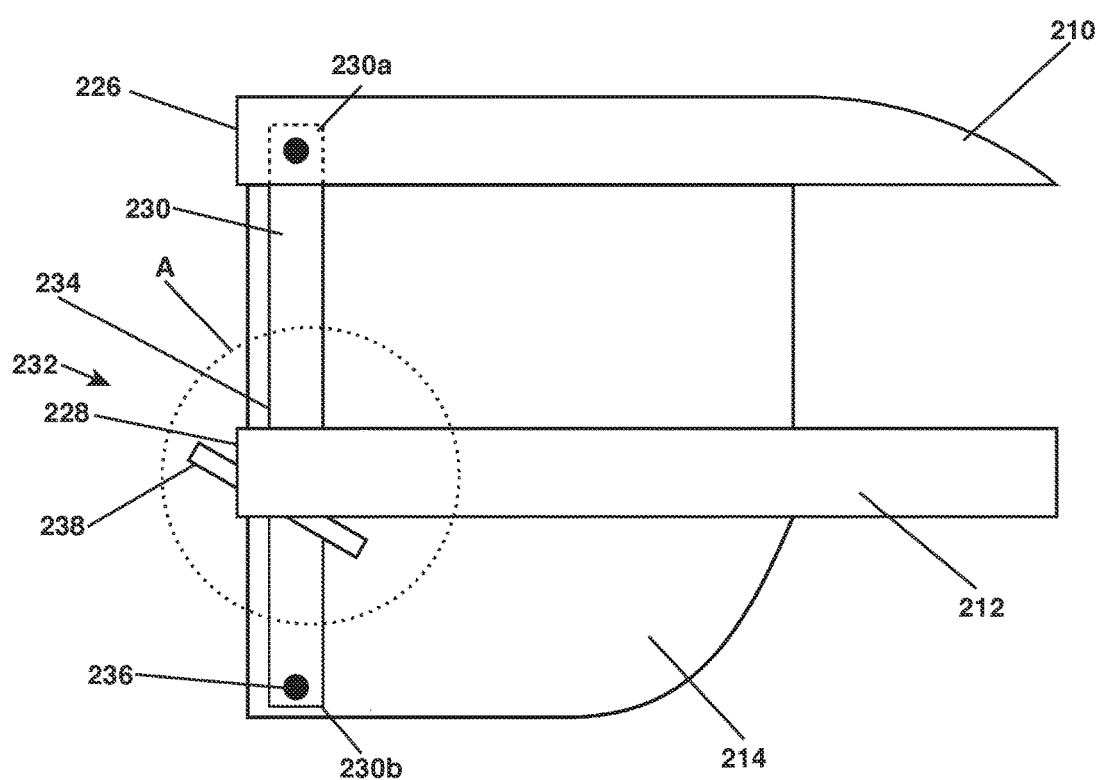
FIG. 6 is a side view of another version of the clamp arm assembly of the collection container system of FIG. 1, showing the clamp arms in an open configuration.
Figure 7:
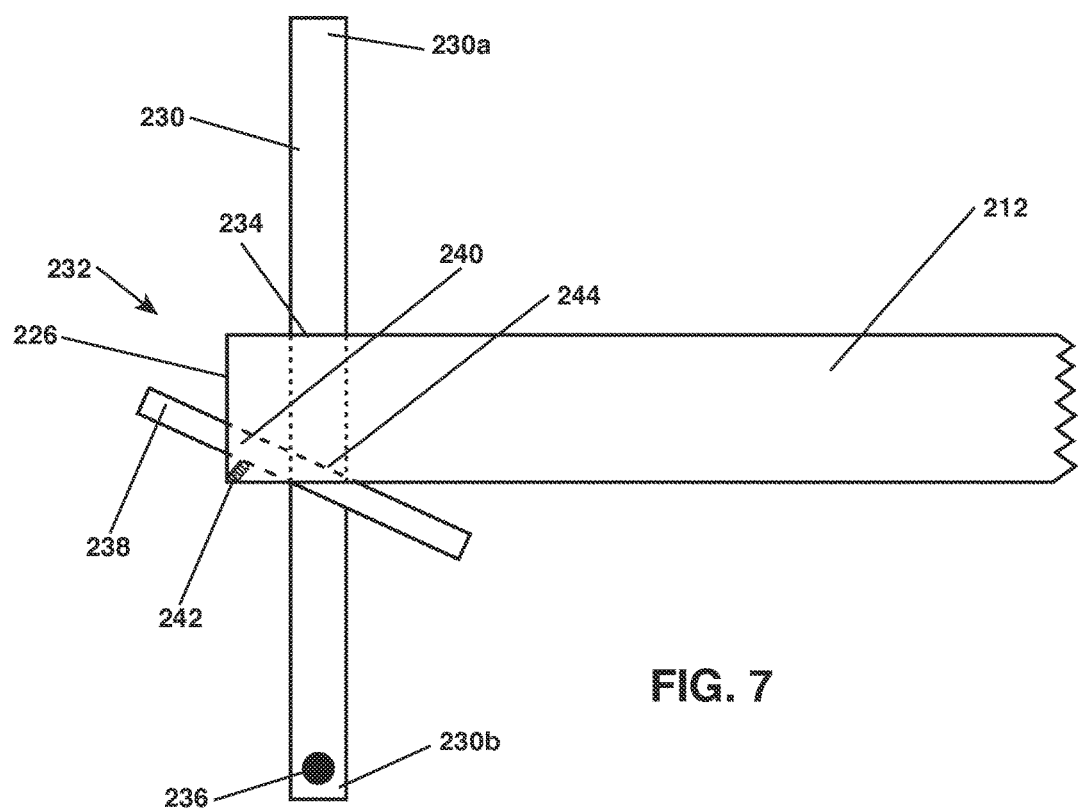
FIG. 7 is a detailed view of the clamp arm assembly of FIG. 6 within the circle A.
Figure 8:
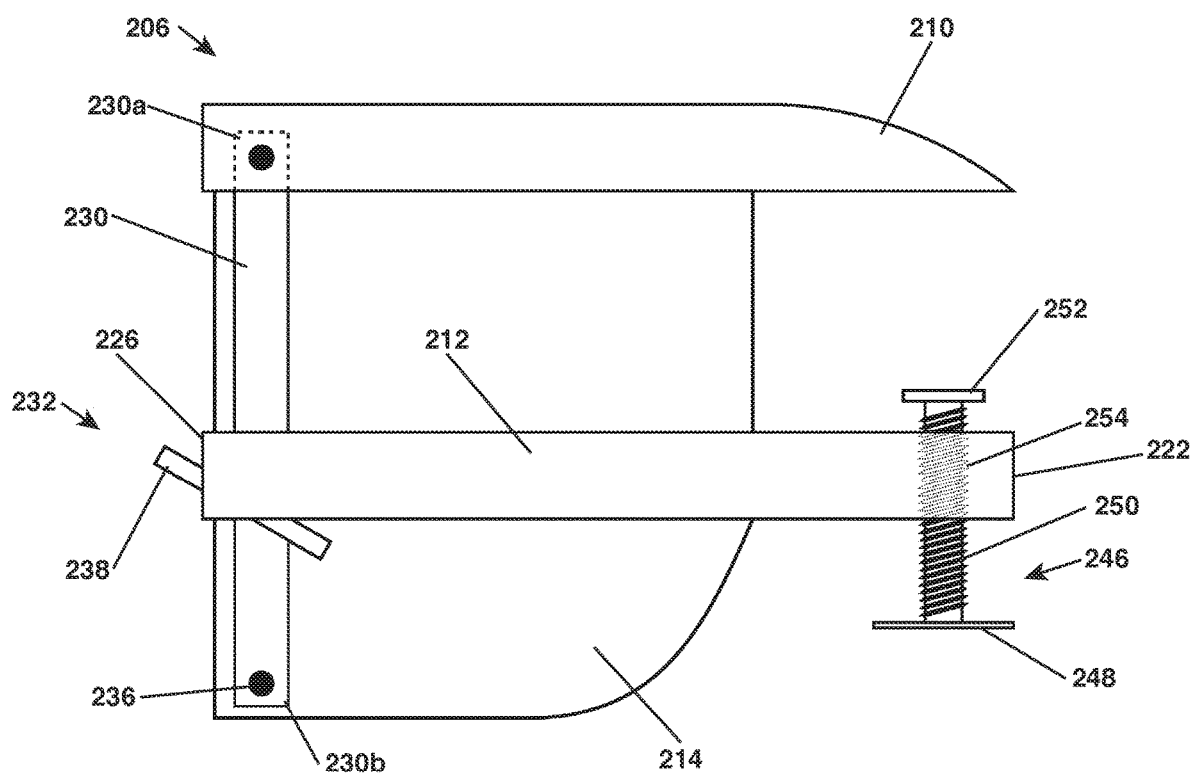
FIG. 8 is a side view of another version of the clamp arm assembly of the collection container system of FIG. 1, constructed in accordance with the principles of the present disclosure, showing the clamp arms in an open configuration.

FIGS. 6-8 illustrate a second exemplary clamp arm assembly 206 constructed in accordance with the teachings of the present disclosure. The clamp arm assembly 206 of this form is similar to the clamp arm assembly 106 of FIGS. 4 and 5, except that the force generating element 120 includes a guide 230 and release mechanism 232. Thus, for ease of reference, and to the extent possible, the same or similar components of the clamp arm assembly 206 will retain the same reference numbers as outlined above with respect to the clamp arm assembly 106 of FIGS. 4 and 5, although the reference numbers will be increased by 100.

Unlike the upper and lower clamp arms 110, 112 of the above clamp arm assembly 106, in one form, only the upper clamp arm 210 of the clamp arm assembly 206 is mounted to the sidewall plate 214 and the upper and lower clamp arms 210, 212 of the clamp arm assembly 206 are coupled together using the guide 230. In another form, the lower clamp arm 212 can be slidingly coupled to the sidewall 214, such as with a track coupling.

In particular, the upper clamp arm 210 may be integrally formed with the sidewall 214 and securely mounted to a proximal end 230a of the guide 230 toward the rear end 226 of the upper clamp arm 126. The lower clamp arm 212, in contrast, is slidably mounted to the guide 230 with the guide 230 extending through an aperture 234 of the lower clamp arm 212. The release mechanism 232 disposed toward the rear end 228 of the lower clamp arm 212 controls and releasably fixes the position of the lower clamp arm 212 on the guide 230. Of course, it will be understood that the aperture 234, and the associated guide 230 and release mechanism 232, can be disposed in an intermediate or forward portion of the lower clamp arm 212. Further, the lower clamp arm 212 may be prevented from sliding off the guide 230 by a stop member 236 disposed at a distal end 230b of the guide 230 and extending laterally outward therefrom to project into a path of the lower clamp arm 212. Additionally, the stop member 236, or other mechanism, such as a fastener, adhesive, or the like, can fixedly secure the guide 230 to the sidewall 214 to prevent any rotational movement of the guide 230 relative to the sidewall 214. In addition or alternative, the guide 230 may also be rigidly secured at a first end 230a to the upper clamp arm 210. With any of the above configurations, the guide 230 may be fixedly secured to prevent rotational movement of the guide 230 relative to the sidewall 214. In such an example, the guide 230 can be an elongated member having a substantially rectangular cross-section, but other cross-sectional shapes (e.g., circular, square, triangular, etc.) may also be used.

In use, a biasing mechanism 242 biases the break lever 238 to an engaged position on the guide 230, such that the break lever 238 resists downward movement of the lower clamp arm 212 along the guide 230, but allows upward movement of the lower clamp arm 212 along the guide 230. With this configuration, the lower clamp arm 212 can be slid along the guide 230 toward the upper clamp arm 210 until the lower clamp arm 212 engages the working surface. By virtue of the break lever 238 being biased to the engaged position, the lower clamp arm 212 is held in position once the lower clamp arm 212 is placed in contact with the working surface. Thereafter, when a user desires to remove the clamp arm assembly 210 from the work surface, the user can simply manipulate the break lever 238 to move the break lever 238 from the engaged position to a release position where the break lever 238 does not engage the guide 230. When the break lever 238 is disengaged from the guide 230, the user can freely slide the lower clamp arm 212 down the guide 230 freeing the work surface from between the clamp arms 210, 212. When the user releases the break lever 238, the biasing mechanism 242 causes the break lever 238 to reengage the guide 230 thereby halting further downward movement of the lower clamp arm 212.

As discussed above, the lower clamp arm 212 is slidably coupled to the guide 230 and may translate along the guide 230 to move toward and away from the fixed, upper clamp arm 210. To secure the lower clamp arm 212 into a position along the guide 230 in other examples, the lower clamp arm 212 includes the release mechanism 232 disposed at the rear end 226 of the lower clamp arm 212. The release mechanism 232 includes the break lever 238 passing through and partially disposed within a recess 240 of the lower clamp arm 212 and the biasing element 242 disposed in the recess 240. The break lever 238 further includes a break lever aperture 244 to slidably receive the guide 230. The biasing element 242 positions the break lever 238 between a locked position and an unlocked position. In the locked position, the biasing element 242 positions the break lever 238 at an angle such that an edge of the aperture 244 engages the guide 230 and prevents the guide 230 from sliding through the aperture 244 and, thus, the opening in the lower clamp arm 212. In the unlocked position, the biasing element 242 is compressed by an external force, which positions the break lever 238 substantially perpendicular to the guide 230, such that the edge of the break lever aperture 244 is spaced away from the guide 230 and the guide 230 slides freely through the aperture 244 and, thus, the opening in the lower clamp arm 212. In some examples, the external force necessary to compress the biasing element 242 can be provided by the break lever 238. In particular, the break lever 238 may be in a first position, wherein the biasing element 242 is fully expanded, and a second position, wherein the biasing element 242 is compressed. Thus, movement of the break lever 238 from the first position to the second position places the break lever 238 in the unlocked position and movement of the break lever 238 from the second position to the first position places the break lever 238 into the locked position.

To move the lower clamp arm 212 closer to the fixed, upper clamp arm 210, the break lever 238 is moved from the locked position to the unlocked position by moving the break lever 238 from the first position to the second position and, once in the unlocked position, the lower clamp arm 212 may freely slide along the guide 230 toward and away from the upper clamp arm 210. To secure the system to the worktop 103, the upper clamp arm 210 is placed on the work surface 102 and the lower clamp arm 212 is slid toward the fixed, upper clamp arm 210 until the lower clamp arm 212 comes into contact with the lower surface 103a of the worktop 103. Once the lower clamp arm 212 comes into contact with the lower surface 103a of the worktop 103, the break lever 238 may be moved from the second position to the first position, thus locking the lower clamp arm 212 into place on the guide 230.

Additionally, the lower clamp arm 212 may further include screw clamp assembly 246 disposed at the front end 222 of the lower clamp arm 212 as depicted in FIG. 8. The screw clamp assembly 246 may include a handle 248, a threaded shaft 250 coupled to the handle 248 at a first end of the threaded shaft 250, and an engagement member or surface 252 disposed at a second end of the threaded shaft 250. The threaded shaft 250 of the screw clamp assembly 246 is threadably received by an internally threaded opening 254 extending through the lower clamp arm 212 and can be turned by exerting a rotational force on the handle 248. The screw clamp assembly 246 may be used to secure the lower clamp arm 212 to the lower surface 103a of worktop 103 and, thus, secure the system to the worktop 103. For example, the lower clamp arm 212 can be slid along the guide 230 to a desired position and locked in place using the release mechanism 232, as discussed above. After the lower clamp arm 212 is locked into position along the guide 230, the engagement surface 252 of the screw clamp assembly 246 may be brought into contact with or tightened on the lower surface 103a of the worktop 103 by turning the handle 248, which causes the engagement surface 252 to travel toward the lower surface 103a of the worktop 103. The use of the screw clamp assembly 246 allows for quick and easy removal of the system from the worktop 103. Additionally, the screw clamp assembly 246 may help secure the system to a work surface that has a difficult shape to which to the system, specifically the lower clamp arm 212 thereof, is secured.

Figure 9:
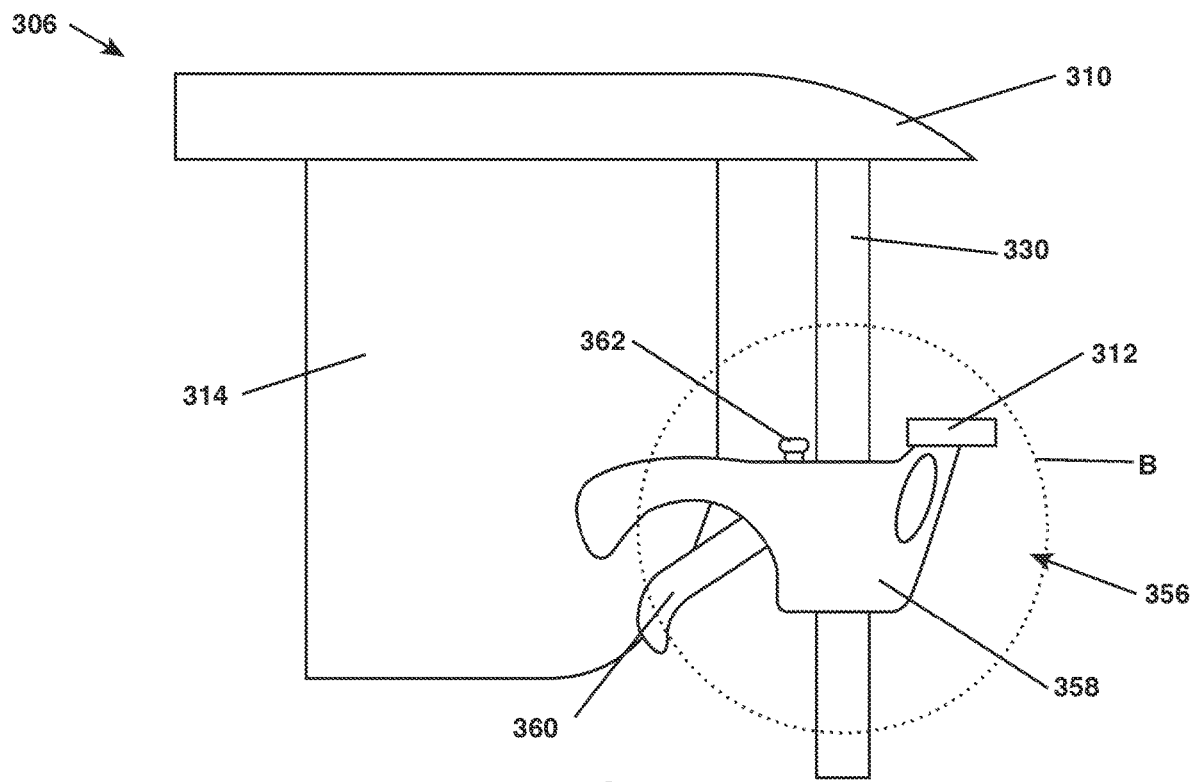
FIG. 9 is a side view of another version of a clamp arm assembly of the collection container system of FIG. 1, constructed in accordance with the principles of the present disclosure, showing the clamp arm in an open configuration.
Figure 10:
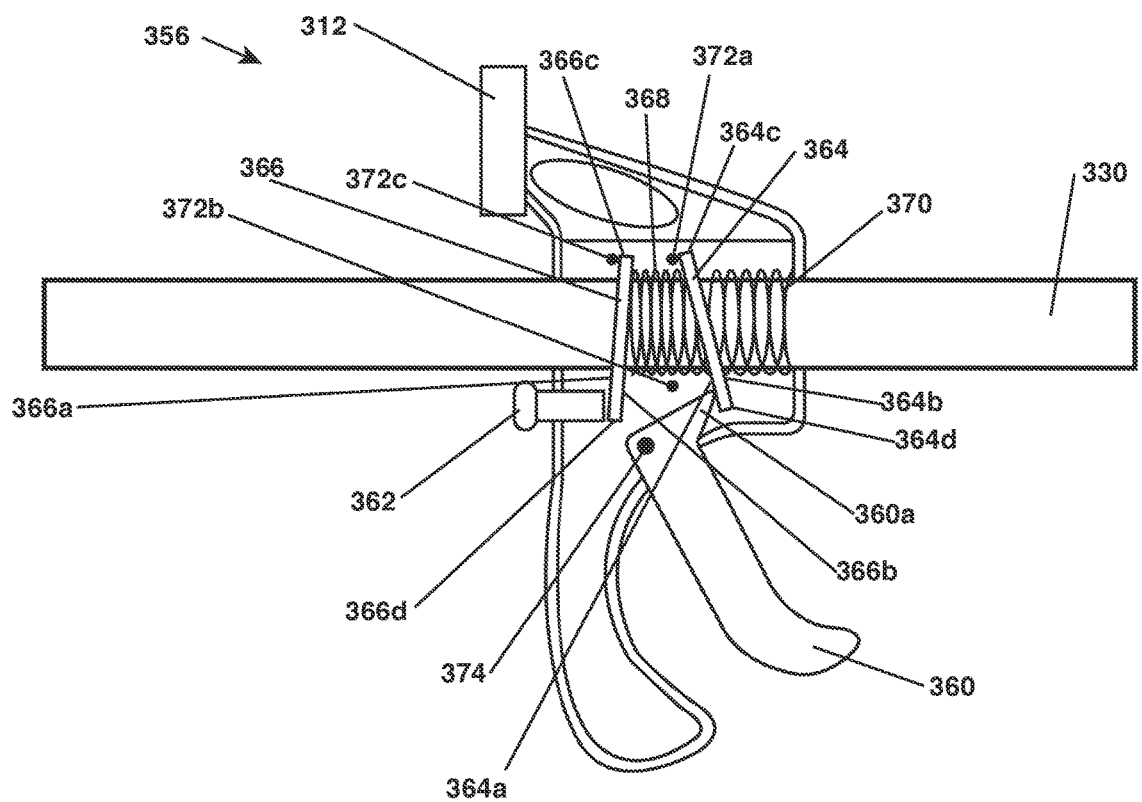
FIG. 10 is a detailed view of the clamp arm assembly of FIG. 9 within the circle B.

FIGS. 9 and 10 illustrate a third exemplary clamp arm assembly 306 constructed in accordance with the teachings of the present disclosure. The clamp arm assembly 306 is similar to the clamp arm assembly 106 described with reference to FIGS. 1-5 except that the clamp arm assembly 306 of this form includes a ratcheting assembly for attaching the container system to a worktop 103. Thus, for ease of reference, and to the extent possible, the same or similar components of the clamp arm assembly 306 will retain the same reference numbers as outlined above with respect to the clamp arm assembly 106 of FIGS. 1-5, although the reference numbers will be increased by 200.

More specifically, rather than the break lever 238 of FIGS. 6 and 7, the force generating element of FIGS. 9 and 10 includes a ratcheting assembly 356 for selectively driving the lower clamp arm 312 toward the upper clamp arm 310, thereby clamping the system to the worktop 103. The ratcheting assembly 356 includes a housing 358 having a trigger 360 and a release button 362 which are partially disposed within the housing 358 and a guide 330 extending through the housing 358. As illustrated in FIG. 10, disposed within the housing 358 is a carry along slide 364 slidably disposed on the guide 330, a detent slide 366 slidably disposed on the guide 330 and spaced away from the carry along slide 364, a first spring 368 disposed between the carry along slide 364 and the detent slide 366, and a second spring 370 disposed between a second side 364b of the carry along slide 364 and the housing 358. Additionally, first, second, and third stoppers 372a, 372b, 372c are disposed within the housing 358. The first and second stoppers 372a, 372b are adapted to engage a first side 364a of the carry along slide 364 and the third stopper 372c is adapted to engage a first side 366a of the detent slide 366. As best illustrated in FIG. 10, a top end 366c of the detent slide 366 is adapted to engage the third stopper 372c, and a bottom end 366d of the detent slide 366 is adapted to engage the release button 362. A top end 364c of the carry along slide 364 is adapted to engage the first stopper 372a and the first side 364a of the carry along slide 364 is adapted to engage the second stopper 372b. Further, the trigger 360 is coupled to a pivot 374 and a top end 360a of the trigger 360 is adapted to engage the first side 364a of the carry along slide 364. In operation, the first spring 368 biases the detent slide 366 such that the detent slide 366 is disposed at an angle relative to the guide that places the detent slide 366 in contact with the guide 330 and the second spring 370 biases the carry along slide in a substantially vertical position such that the guide 330 is not in contact with the carry along slide 364. In particular, because the detent slide 366 is at an angle relative to the guide 330 that places the detent slide 366 in contact with the guide 300, the detent slide 366 prohibits movement of the housing 358 relative to the guide 330 until the detent slide 366 is in a substantially vertical position. Thus, to allow the housing 358 to move relative to the guide 330, the release button 362 is pressed toward the housing 358, which causes the detent slide 336 to move into a substantially vertical position relative to the guide 330 because the third stopper 372c only allows the bottom end 366s of the detent slide 366 to translate.

The housing 358 can also move relative to the guide 330 through use of the trigger 360. In particular, the carry along slide 364 is disposed in substantially vertical position while the trigger 360 is in an unengaged position. By engaging the trigger 360 (FIG. 10), i.e., by squeezing the trigger, the trigger 360 rotates about the pivot 374 causing the top end 360a of the trigger 360 to rotate in a clockwise manner. In turn, the bottom end 364d of the carry along slide 364 translates while the top end 364c of the carry along slide 364 remains in contact with the first stopper 372a. Translation of the bottom end 364d of the carry along slide 364 compresses the second spring 370 and causes the housing 358 to translate along the guide 330. In particular, as the carry along slide 364 moves from a substantially vertical position, relative to the guide 330, to an angled position, relative to the guide 330, the carry along slide 364 engages the guide 330 which causes the housing 358 to translate along the guide 330.

FIGS. 11-14 illustrate a fourth exemplary clamp arm assembly 406 constructed in accordance with the present disclosure. The clamp arm assembly 406 is similar to the above clamp arm assembly 106 described with reference to FIGS. 1-5, except that the clamp arm assembly 406 of this form includes a vice-grip locking assembly 476 for attaching the container system to a worktop 403. Thus, for ease of reference, and to the extent possible, the same or similar components of the clamp arm assembly 406 will retain the same reference numbers as outlined above with respect to the clamp arm assemblies 106 of FIGS. 1-5, although the reference numbers will be increased by 300.

More specifically, the clamp arm assemblies 406 of this form include a vice-grip locking assembly 476 for selectively engaging the lower surface 403a of the worktop 403 and an upper clamp arm 410 for selectively engaging the work surface 102. The vice grip assembly 476 includes a handle 478, a jaw 480, a jaw arm 482, an adjustable link 484, a spring 486 or other biasing member or mechanism, a linkage release arm 488, and an adjustment screw 490. The handle 478 is pivotably coupled to the jaw arm 482 at a first pivot 492a disposed at a first end 482a of the jaw arm 482. The jaw 480 is pivotably coupled to the jaw arm 482 at a second pivot 492b disposed at a second end 482b of the jaw arm 482. The jaw arm 482 is pivotably coupled to the sidewall 414 at a third pivot 492c disposed at the first end 482a of the jaw arm 482. The linkage release arm 488 is pivotably coupled to the handle 478 at a fourth pivot 492d. The adjustable link 484 is pivotably coupled to the handle 478 at a fifth pivot 492e. Finally, the spring 486 is fixedly secured to the sidewall 414 at a first end 486a and releasably secured to the jaw arm 482 at a second end 486b.

Figure 11:
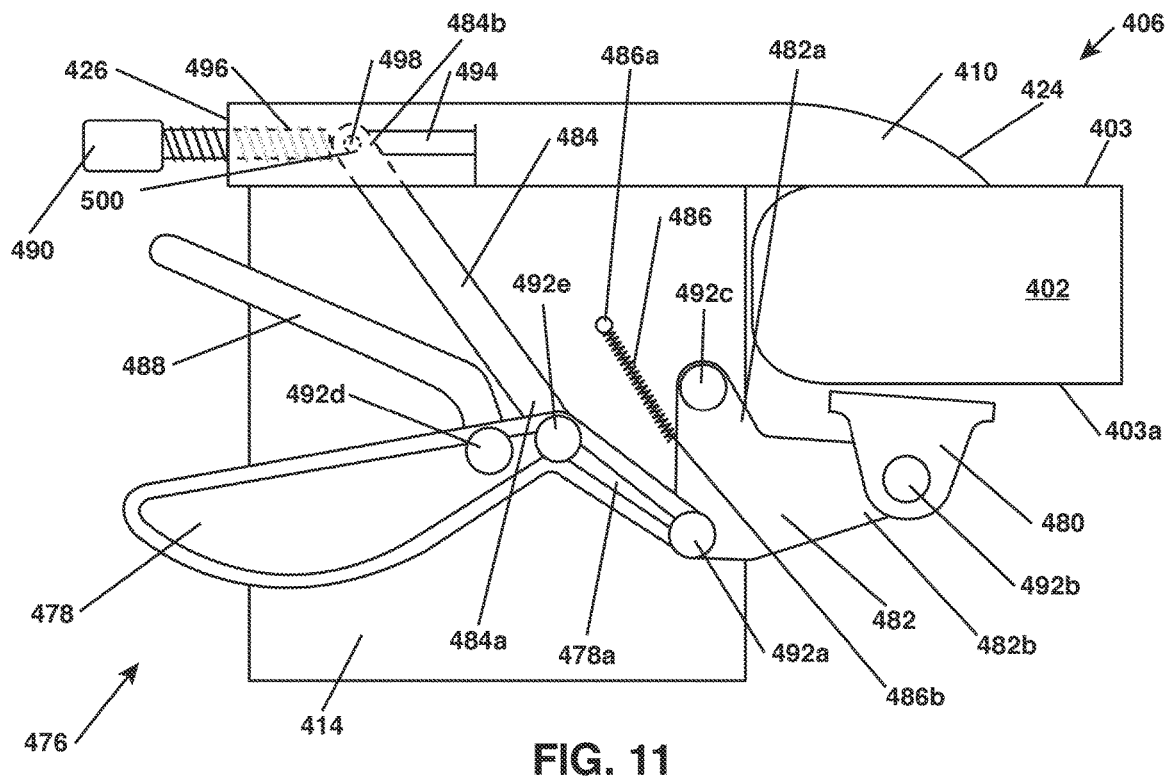
FIG. 11 is a side view of another version of a clamp arm assembly of the collection container system of FIG. 1, constructed in accordance with the principles of the present disclosure, showing the clamp arm in an open configuration.
Figure 12:
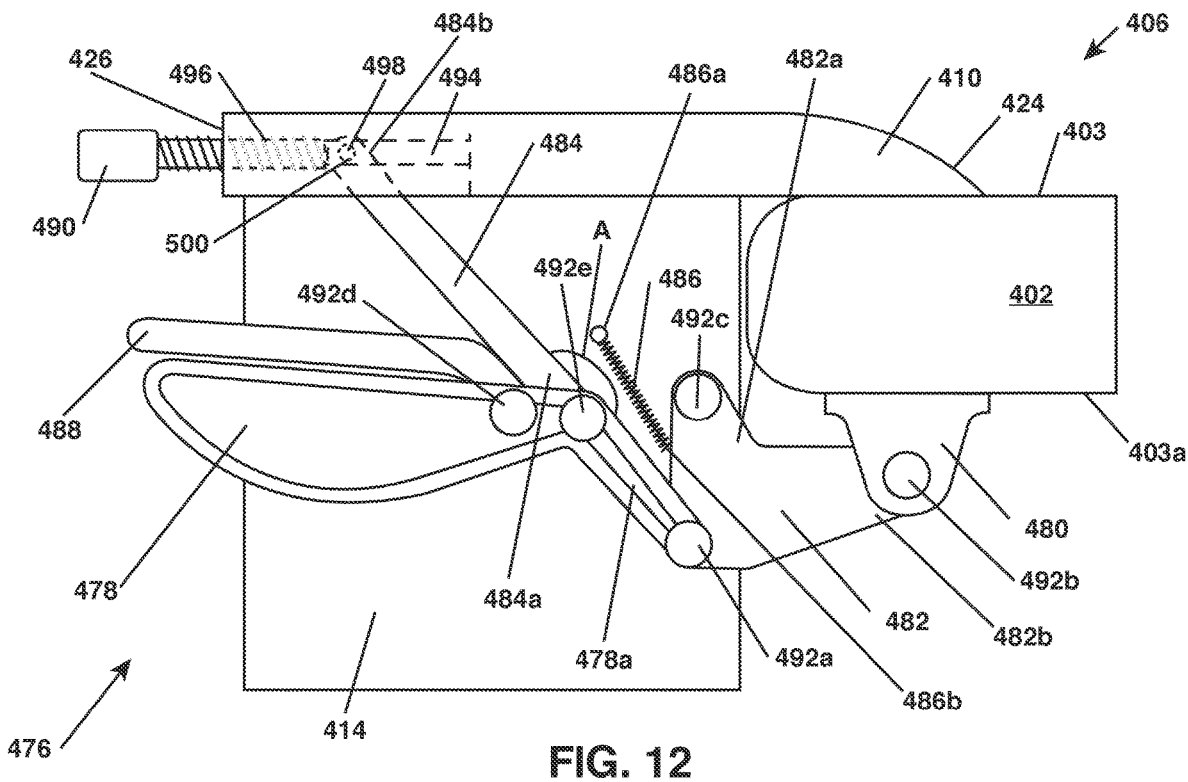
FIG. 12 is a side view of the clamp arm assembly of FIG. 11, showing the clamp arm in a closed configuration.

As best illustrated in FIG. 11, a first end 484a of the adjustable link 484 is pivotably coupled to the handle 478 at the fifth pivot 492e and a second end 484b of the adjustable link 484 is pivotably coupled to the adjustment screw 490. Further, the second end 484b of the adjustable link 484 can be mounted within a slot 494 disposed toward the rear end 426 of the upper clamp arm 410. As shown, the slot 494 is connected to a threaded cavity 496 in the upper clamp arm 410 to receive the adjustment screw 490. For example, the second end 484b of the adjustable link 484 can have an aperture 498 and a rod 500 disposed through the aperture 498 to be received within the slot 494. In particular, the rod 500 may sit on a ledge within the slot 494, which keeps the second end 484b of the adjustable link 484 disposed within the slot 494. With this configuration, as the adjustment screw 490 is threaded into and out of the threaded cavity 496, the second end 484b of the adjustment linkage 484 translates toward and away from the rear end 426 of the upper clamp arm 410.

In operation, the upper clamp arm 410 is placed on the work surface 402 such that the jaw 480 is disposed below the work surface 402, as illustrated in FIG. 11. To secure the jaw 480 to the lower surface 403a of the worktop 403, for example, a user squeezes the handle 478, causing the linkage release arm 488 to be brought together with the handle 478, toward the upper clamp arm 410. Squeezing the handle 478 and the linkage release arm 488 toward the upper clamp arm 410 causes the jaw arm 482 to pivot the jaw 480 towards the front end 424 upper clamp arm 410. The handle 478 and linkage release arm 488 are pivoted until the adjustable link 484 and a front portion 478a of the handle 478 are disposed at an angle A (FIG. 12) with respect to one another of more than 180°. With a correctly positioned adjustment screw 490, the upper clamp arm 410 and the jaw 480 compress on either side of the worktop 403 prior to the angle A passing 180°, such that after the angle A passes 180°, the linkage release arm 488 locks the handle 478 and adjustable link 484, as well as the jaw arm 482 and jaw 480, in place. To release the components of the locking assembly 476, a user can pivot the linkage release arm 488 away from the handle 478, which causes the handle 478 to pivot with respect to the adjustable link 484 and bring the angle A (FIG. 12) below 180°. If a user finds that the jaw 480 does not contact or compress sufficiently against the lower surface 403a of the worktop 403 to lock the components of the locking assembly 476, the user can simply tighten the adjustment screw 490 and, conversely, if the jaw 480 contacts the lower surface 403a of the worktop 403 prematurely, the user can loosen the adjustment screw 490.

Figure 13:
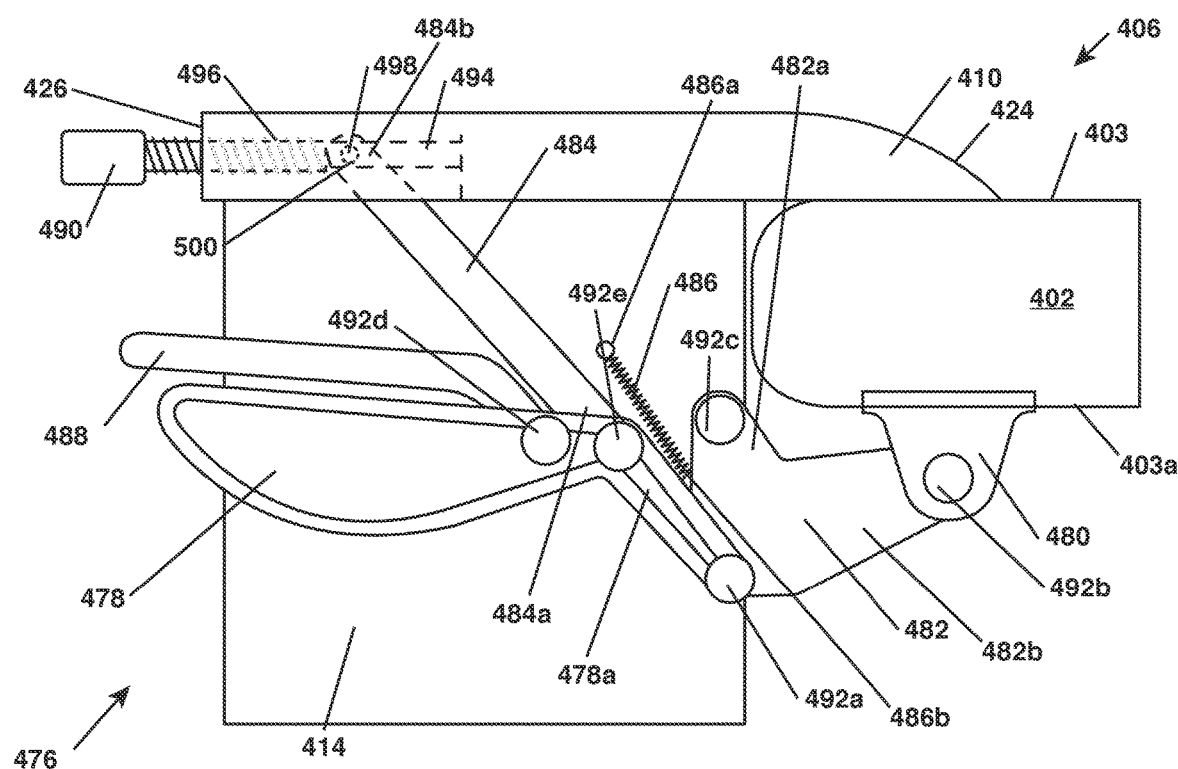
FIG. 13 is a side view of the clamp arm assembly of FIG. 11, showing the clamp arm in a closed configuration.
Figure 14:
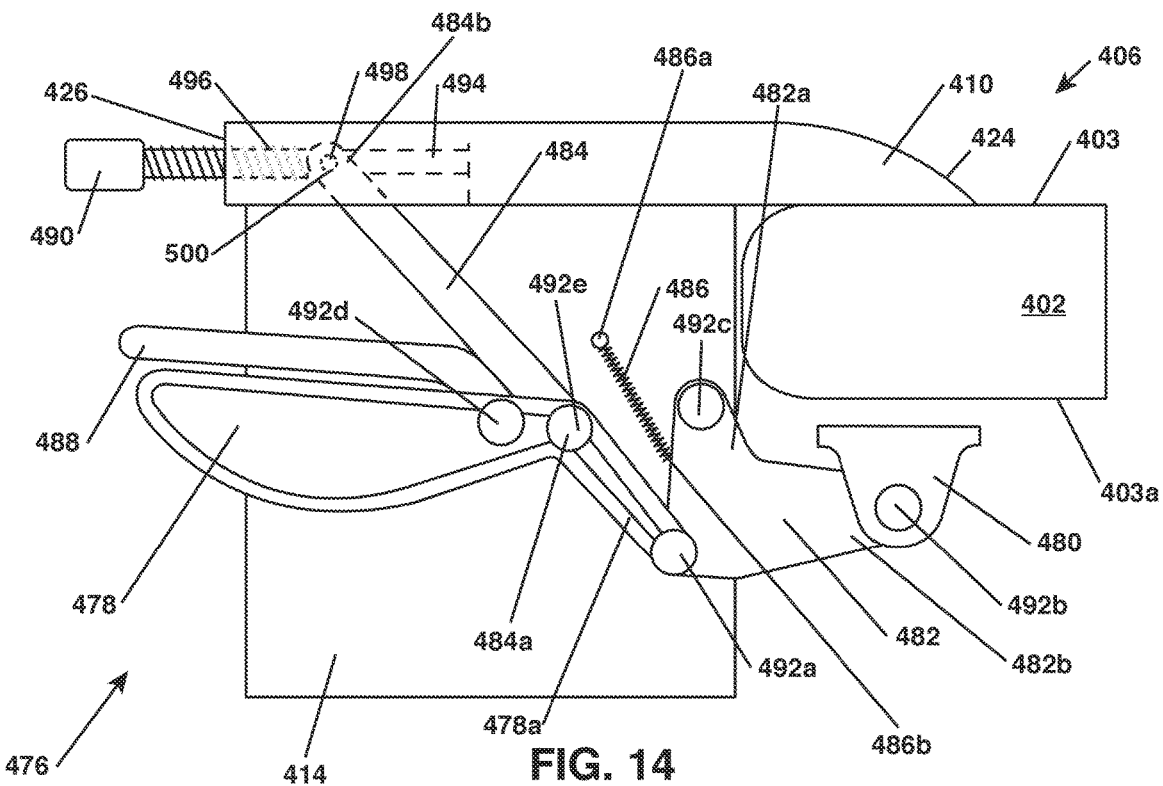
FIG. 14 is a side view of the clamp arm assembly of FIG. 11, showing the clamp arm in a closed configuration.

Of course, in an alternative method, the handle 478 and the adjustable link 484 can be brought together until the angle A (FIG. 12) is between 170° and 180° and, more particularly, between 177° and 180°. Once the handle 478 and the linkage release arm 488 are brought together, the adjustment screw 490 can be rotated until the jaw 480 comes into contact with the lower surface 403a of the worktop 403. In particular, rotation of the adjustment screw 490 causes the jaw arm 482 to rotate about the third pivot 492c to bring the jaw 480 into contact with the lower surface 403a of the worktop 403. Further, as depicted in FIGS. 13 and 14, the adjustment screw 490 also adjusts the distance between the jaw 480 and the upper clamping arm 410 allowing the locking mechanism 476 to secure the container system to work surfaces of varying thickness with ease. In particular, as discussed above, as the adjustment screw 490 is loosened, i.e., the second end 484b of the adjustable link 484 moves toward the rear end 426 of the upper clamp arm 410, the distance between the upper clamp arm 410 and the jaw 480 becomes greater. In the alternative, as the adjustment screw 490 is tightened, i.e., the second end 484b of the adjustable link 484 moves away from the rear end 426 of the upper clamp arm 410, the distance between the upper clamp arm 410 and the jaw 480 becomes smaller. Thus, by tightening or loosening the adjustment screw 490, the locking assembly 476 can secure the container system to work surfaces 402 of varying thicknesses.

FIGS. 15-18 illustrate another exemplary collection container system 600 constructed in accordance with the present disclosure. The container system 600 is similar to the container system 100 of FIGS. 1-5, except that the container system 600 includes a container portion 604 that is detachable from the clamp arm assemblies 606. Thus, for ease of reference, and to the extent possible, the same or similar components of the container system 600 will retain the same reference numbers as outlined above with respect to the container system 100 of FIGS. 1-5, although the reference numbers will be increased by 500.

Figure 15:
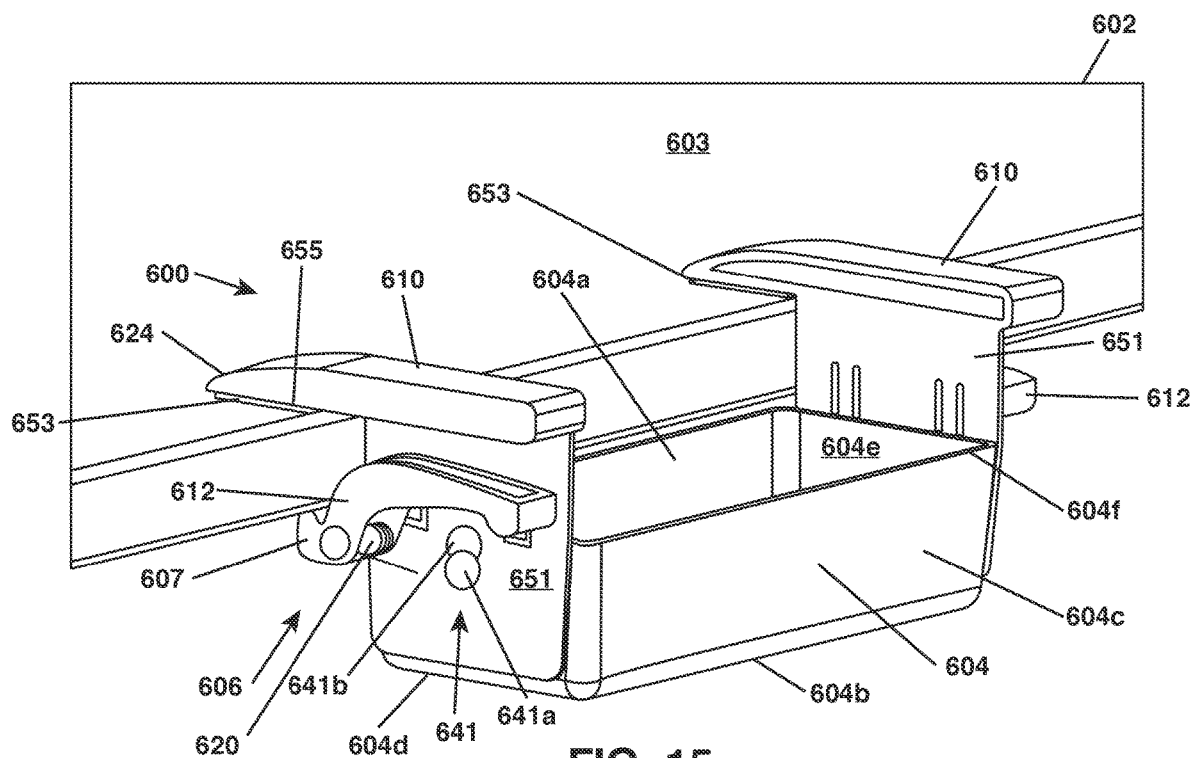
FIG. 15 is a perspective view of another embodiment of a collection container system, constructed in accordance with the principles of the present disclosure, removably attached to a work surface.

Unlike the clamp arm assemblies 106 described above, the clamp arm assemblies 606 of this container system 600 are releasably coupled to the container portion 604 via a securement mechanism 641. In particular, the container system 600 includes the container portion 604 and the clamp arm assemblies 606 secure to the container portion 604 via the securement mechanism 641. As best illustrated in FIG. 15, the container portion 604 includes a front wall 604a, a bottom wall 604b, a back wall 604c, a first side wall 604d that extends from the bottom wall 604b and between the front and back walls 604a, 604c, and a second side wall 604e that extends from the bottom wall 604b and between the front and back walls 604a, 604c. The first and second side walls 604d, 604e include a male portion 641a of the securement mechanism 641. The male portion 641a of the securement mechanism 641 may take any suitable form that securely engages a female portion 641b of the securement mechanism 641. For example, briefly turning to FIG. 35, the male portion 641a of the securement mechanism 641 can be a knob having a neck portion 643 and retaining portion 645 extending outwardly from an end of the neck portion 645. As shown, the knob 641a extends laterally from the container portion side walls 604d, 604e. In another example, the male portion 641a can be a hook member that projects through the female portion 641b to retain the container portion 604 on the clamp arm assemblies 606. If desired, the hook members can loosely retain the container portion 604 so that a user can simply set the container portion 604 on a surface and the clamp arm assemblies 606 will fall off or can be easily moved downward to release the hook members.

Figure 35:
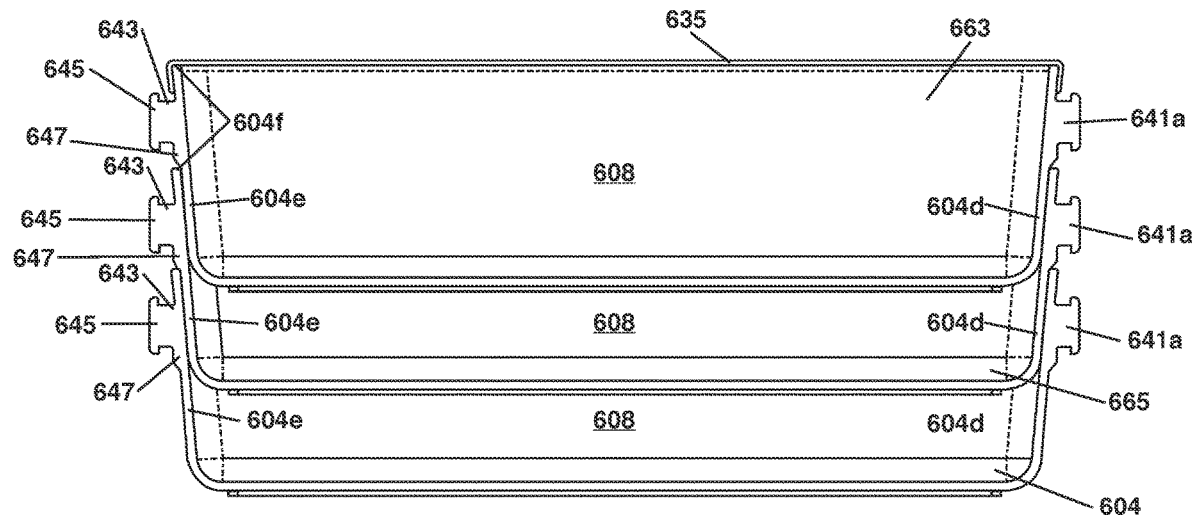
FIG. 35 is another cross-sectional, side view of the multiple collection containers of FIG. 33.

If desired, the securement mechanism 641 can include a rotation lock that prevents rotation of the container portion 604 relative to the clamp arm assemblies 606. Specifically, as illustrated in FIG. 35, the male portion 641a of the securement mechanism 641 can include a key protrusion 647 that inserts into a slot 649 (FIG. 18) to prevent rotation and movement of the container portion 604 when coupled to the clamp arm assemblies 606. For example, the key protrusion 647 can extend downwardly from the male portion 641a of the securement mechanism 641.

Turning back to FIGS. 15-18, the clamp arm assemblies 606 include an upper clamp arm 610, a wall 651 extending downwardly from the upper clamp arm 610, a lower clamp arm 612 pivotably coupled to the wall 651, a force generating element 620 (FIGS. 15 and 16) to bias the lower clamp arm 612 toward the upper clamp arm 610, and the female portion 641b of the securement mechanism 641 provided in the wall 651. A forward portion 624 of the upper clamp arm 610 is configured to extend over and engage the work surface 602. The wall 651 may take any shape, such as, for example, rectangular, triangular, trapezoidal, circular, etc. The upper clamp arm 610 can also include a pad 653 disposed on a clamping surface 655 of the upper clamp arm 610, which engages the work surface 602. The pad 653 may be any non-abrasive material and, in some examples, may include a non-slip insert or portion that aids in securing the container system 600 to the work surface 602.

Figure 16:
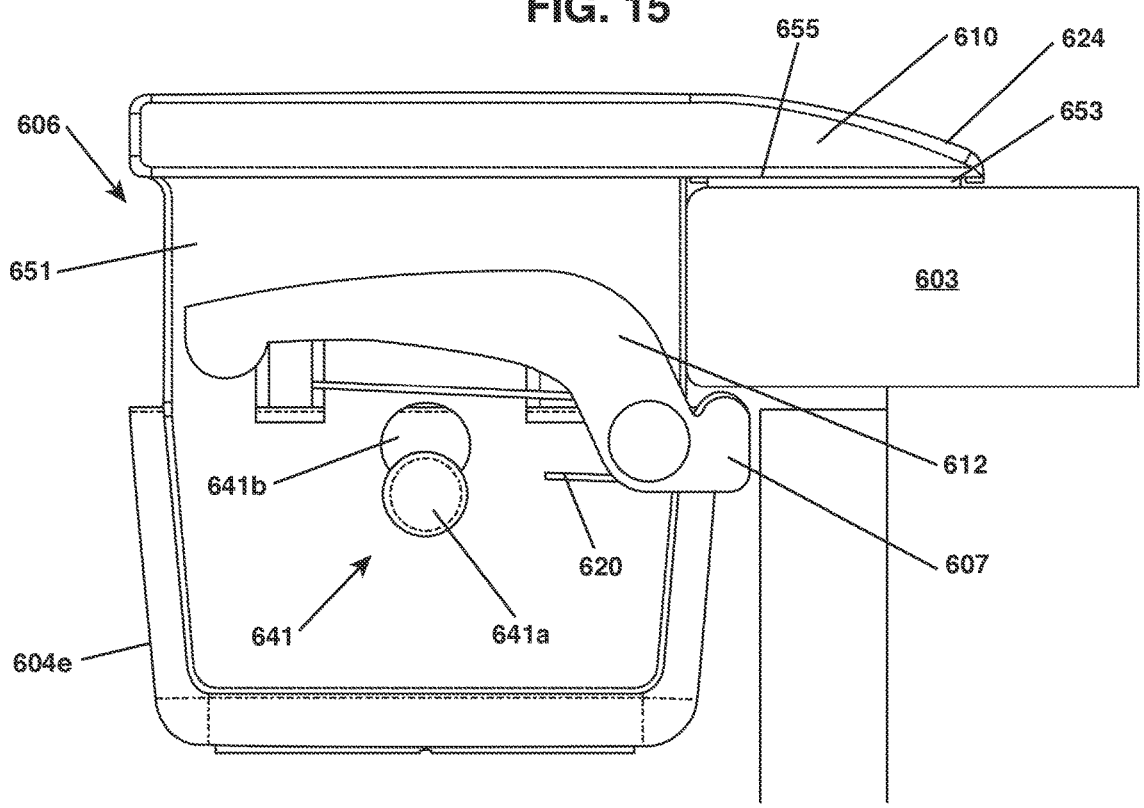
FIG. 16 is a side view of the collection container system of FIG. 15.
Figure 17:
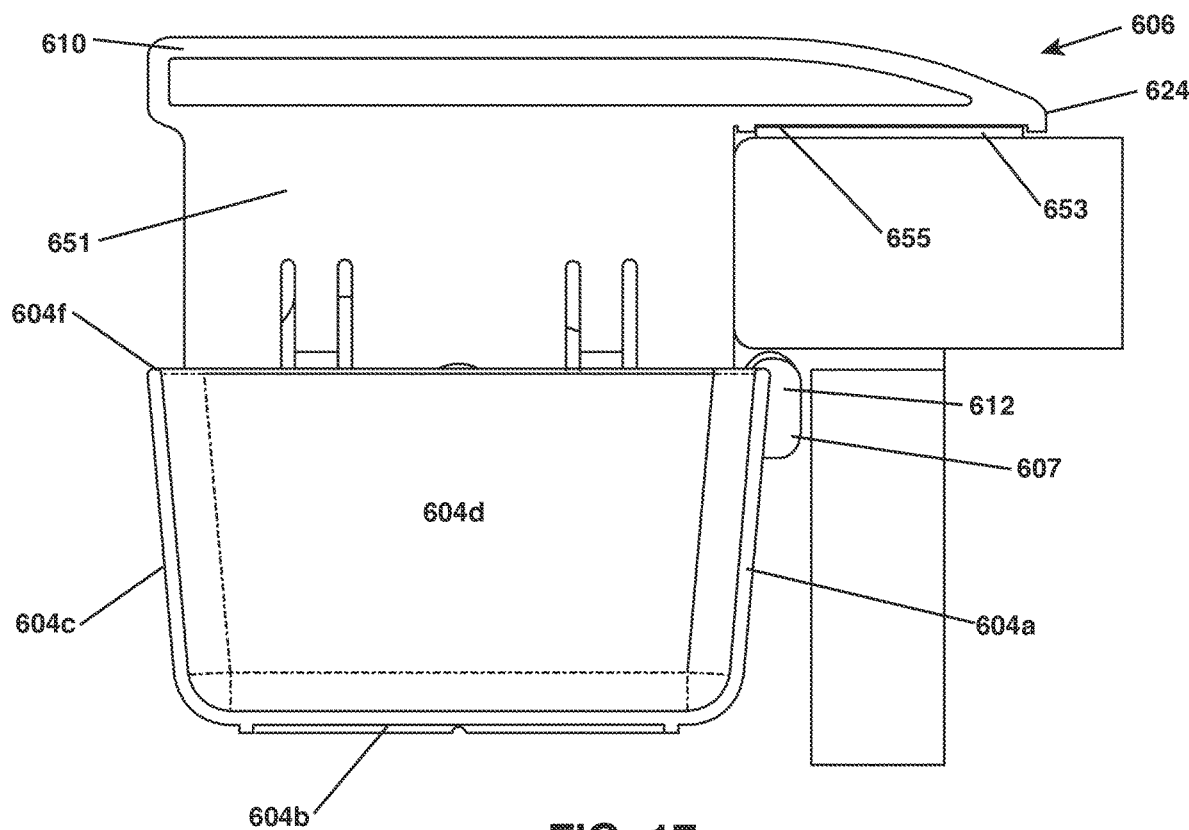
FIG. 17 is a cross-sectional, side view of the collection container system of FIG. 15.

The clamp arm assemblies 606 can further include a foot 607 that projects forwardly below the lower clamp arm 612 to engage a structure underneath the worktop 603 (FIGS. 15 and 16). Advantageously, by engaging the structure, the foot 607 can counteract any moment force acting on the clamp arm assemblies 606 from the weight of the clamp arm assemblies 606, the container portion 604, and any contents in the container portion 604. In some versions, the clamp arm assemblies 606 can include a rear flange defining an upwardly, opening slot sized to receive a lid (not shown) therein. Example lids are discussed below. Advantageously, the flange can vertically orient the lid received therein behind and above the container portion 604, so that the lid can function as a backstop when using the system 600. It will be understood that the other clamp arm assemblies described herein can be modified to include a similar flange.

Figure 18:
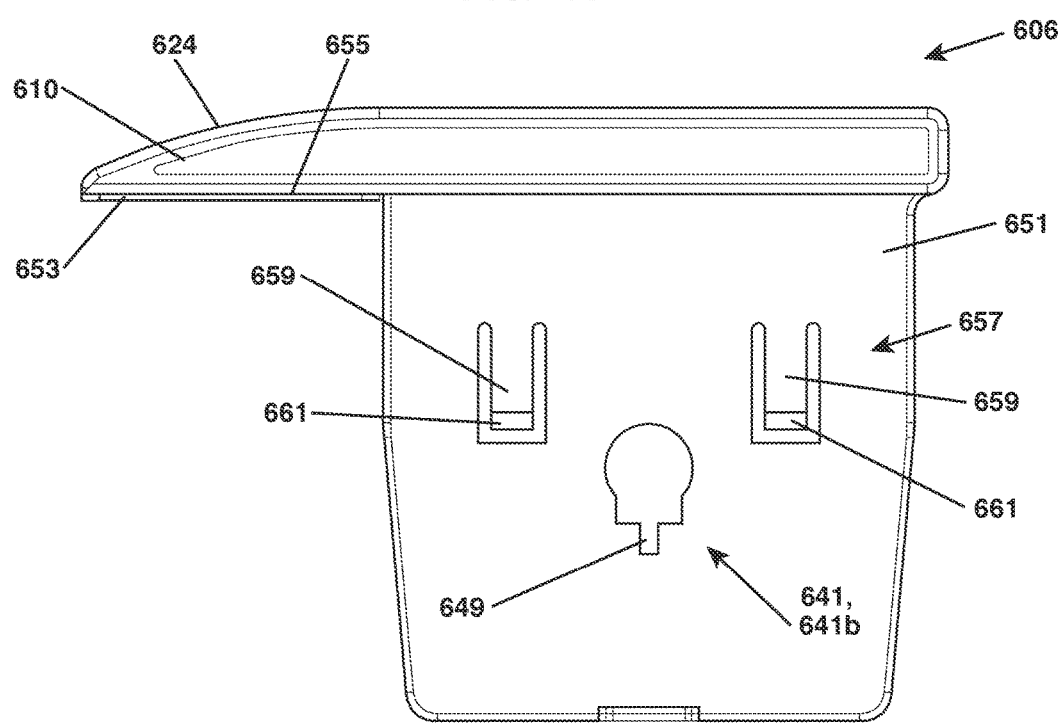
FIG. 18 is a side view of a side arm assembly of the collection container system of FIG. 15.

As shown in FIG. 18, the female portion 641b of the securement mechanism 641 includes the slot 649 to releasably receive the key protrusion 647 (FIG. 35) of the male portion 641a of the securement mechanism 641 that extends from each of the side walls 604d, 604e (FIG. 15) of the container portion 604. The female portion 641b of the securement mechanism 641 may take any suitable shape and form. For example, the female portion 641b of the securement mechanism 641 can be an aperture extending through the wall 651 and the slot 649 can extend downwardly from a main portion of the aperture to receive the key protrusion 647 (FIG. 35) of the male portion 641a of the securement mechanism 641. With the key protrusion 647 disposed within the slot 649, the container portion 604 is prevented from rotating with respect to the clamp arm assemblies 606.

The clamp arm assemblies 606 can further include a locking mechanism 657 to hold the container portion 604 in a seated, engaged position within the female portion 641b of the securement mechanism 641. Specifically, in the illustrated form of FIG. 18, the locking mechanism 657 can be a tab 659 that projects inwardly from the wall 651 to engage a top edge 604f (FIG. 15) of the container portion 604 when the male portion 641a of the securement mechanism 641 is fully seated within the female portion 641b. The at least one tab 659 can be biased toward the container portion 604, i.e., toward the other of the clamp arm assemblies 606, so that mounting the container portion 604 to the clamp arm assembly 606 resiliently deflects the tab 659 outwardly. As shown, the at least one tab 659 can be integrally formed with the wall 651 and can include a projection 661 that extends from a front surface of the at least one tab 659 that projects over the top edge 604f (FIG. 15) of the container 604 in a secured configuration.

In an alternative version, the securement mechanism 641 of the clamp arm assemblies 606 can be a deflectable latch (not illustrated) that projects under the container portion 604 when the clamp arm assembly 606 is secured to the container portion 604. In one approach, the latch can be a mechanical latch that is biased inwardly by a spring or other mechanism. If desired, the mechanical latch can include a depressible release mechanism or button, so that when a user would like to remove the clamp arm assembly 606 from the container portion 604, the user can simply actuate the button to deflect the latch out from underneath the container portion 604. In another approach, the latch can be made from a resilient material that allows the latch to be deflected as the clamp arm assembly 606 is mounted to the container portion 604, but resiliently deflect underneath the container portion 604 when the clamp arm assembly 606 is fully seated. In these forms, the clamp arm assembly 606 and the container portion 604 can include a cooperating tongue and groove structure so that the clamp arm assembly 606 and container portion 604 are restricted from moving laterally with respect to one another as the clamp arm assembly 606 is secured to the container portion 604.

In use, as the clamp arm assemblies 606 slidably mount onto the container portion 604, the force applied by the container portion 604 against the at least one tab 659 presses the at least one tab 659 away from the container portion 604 until the top edge 604f (FIG. 15) of the container portion 604 passes the at least one tab 659. After the top edge 604f of the container portion 604 passes the at least one tab 659, the resilience of the at least one tab 659 returns the at least one tab 659 to its resting state, i.e., the at least one tab 659 is biased toward the container portion 604 and extends over the top edge 604f of the container portion 604 to retain the male portion 641a of the securement mechanism 641 within the female portion 641b thereof.

In other examples, the securement mechanism 641 could take the form of a ball and socket wherein the socket (i.e., the female portion 641b) could be disposed on the wall 651 and the ball (i.e., the male portion 604a) could be disposed on the first and second sidewall plates 604d, 604e of the container portion 604. However, the securement mechanism 641 may take other forms, such as: a groove and tongue, wherein the groove (i.e., the female portion 641b) may slidably receive the tongue (i.e., the male portion 641a); a hook and loop fastener; a snap-fit attachment mechanism; etc.

FIGS. 19-26 illustrate another exemplary container system 700 constructed in accordance with the present disclosure. The container system 700 is similar to the container system 600 of FIGS. 15-18, except that the container system 700 includes first and second clamp arm assemblies 706 that include a lower clamp arm 712 that is incrementally actuated toward an upper clamp arm 710. Thus, for ease of reference, and to the extent possible, the same or similar components of the container system 700 will retain the same reference numbers as outlined above with respect to the container system 600 of FIGS. 15-18, although the reference numbers will be increased by 100.

Unlike the clamp arm assemblies 606 described above, the clamp arm assemblies 706 of the container system 700 include the lower clamp arm 712 coupled to an advancement mechanism that translates the lower clamp arm 712 toward an upper clamp arm 710. In particular, the container system 700 includes a container portion 704, a lid 735 that is adapted to couple to the container portion 704, and clamp arm assemblies 706. The clamp arm assemblies 706 are releasably attachable to the container portion 704, which allows the container portion 704 to be placed in a location for storage (e.g., fridge, freezer, cabinet, etc.) or to be placed in a location for serving (e.g., table, island, countertop, etc.). In the example illustrated in FIGS. 19 and 20, the clamp arm assemblies 706 are releasably attached to the container portion 704 using the locking mechanism 757 discussed with respect to the clamp arm assemblies 606 of the container system 600. Accordingly, so configured, the locking mechanism 757 includes a tab 759 and a projection 761 (FIG. 22) that extends outwardly from the respective clamp arm assemblies 706. The tabs 759, as illustrated in the example of FIG. 20, extend below an upper lip 771 of the container portion 704. In particular, as the clamp arm assemblies 706 are slidably attached to the container portion 704, the tabs 759 flex away from the container portion 704 until the upper lip 771 of the container portion 704 passes a bottom of the tabs 759. While the illustrated examples depict two tabs 759, it is envisioned that less than two tabs or more than two tabs may be used.

Figure 22:
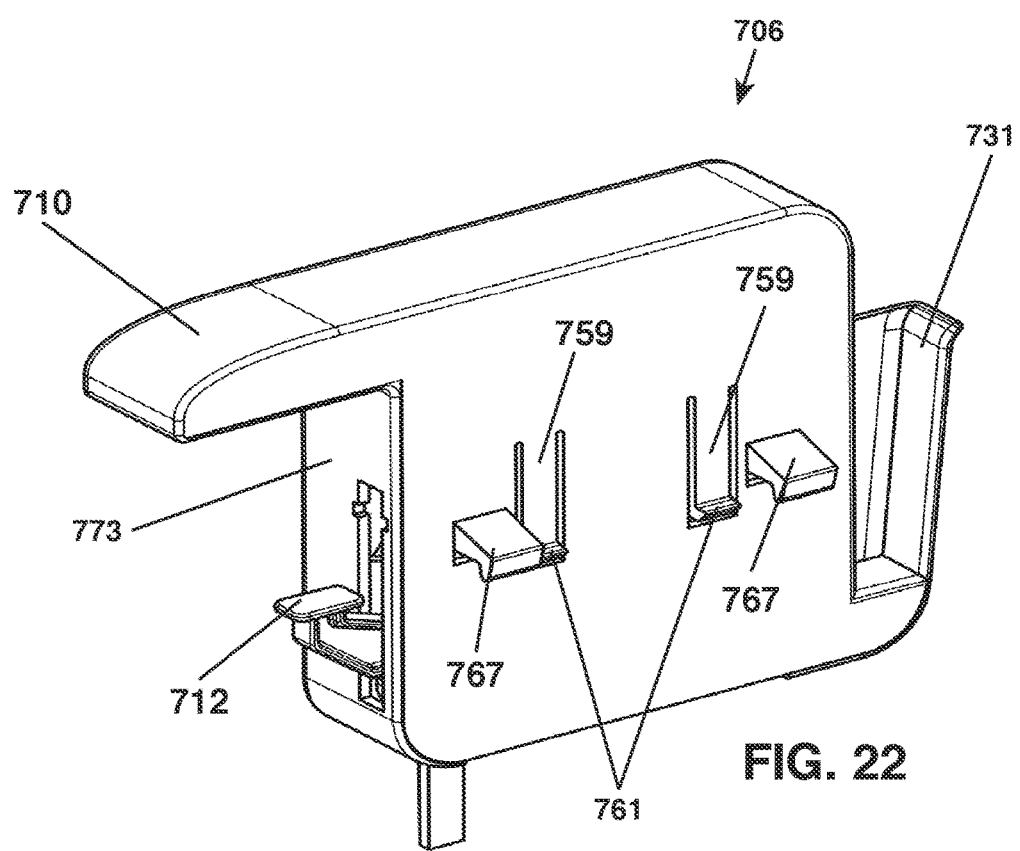
FIG. 22 is another perspective view of the example side arm assembly of FIG. 21.
Figure 23:
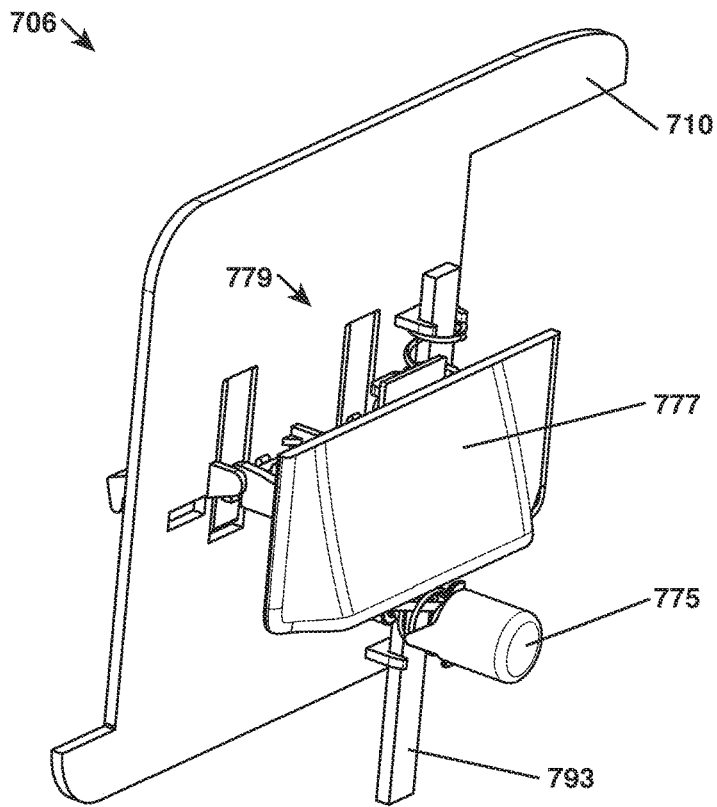
FIG. 23 is a perspective view of the example side arm assembly of FIG. 21 with various components removed.

The example clamp arm assemblies 706 illustrated in FIG. 22 also include a plurality of hooks 767 extending away from each respective clamp arm assembly 706. The plurality of hooks 767, similar to the tabs 759, secure the container portion 704 to each of the clamp arm assemblies 706. However, the plurality of hooks 767, unlike the tabs 759, extend away from the clamp arm assemblies 706 and over the upper lip 771 of the container portion 704. So configured, the plurality of hooks 767 limit upward movement of the container portion 704 relative to the clamp arm assemblies 706.

Figure 21:
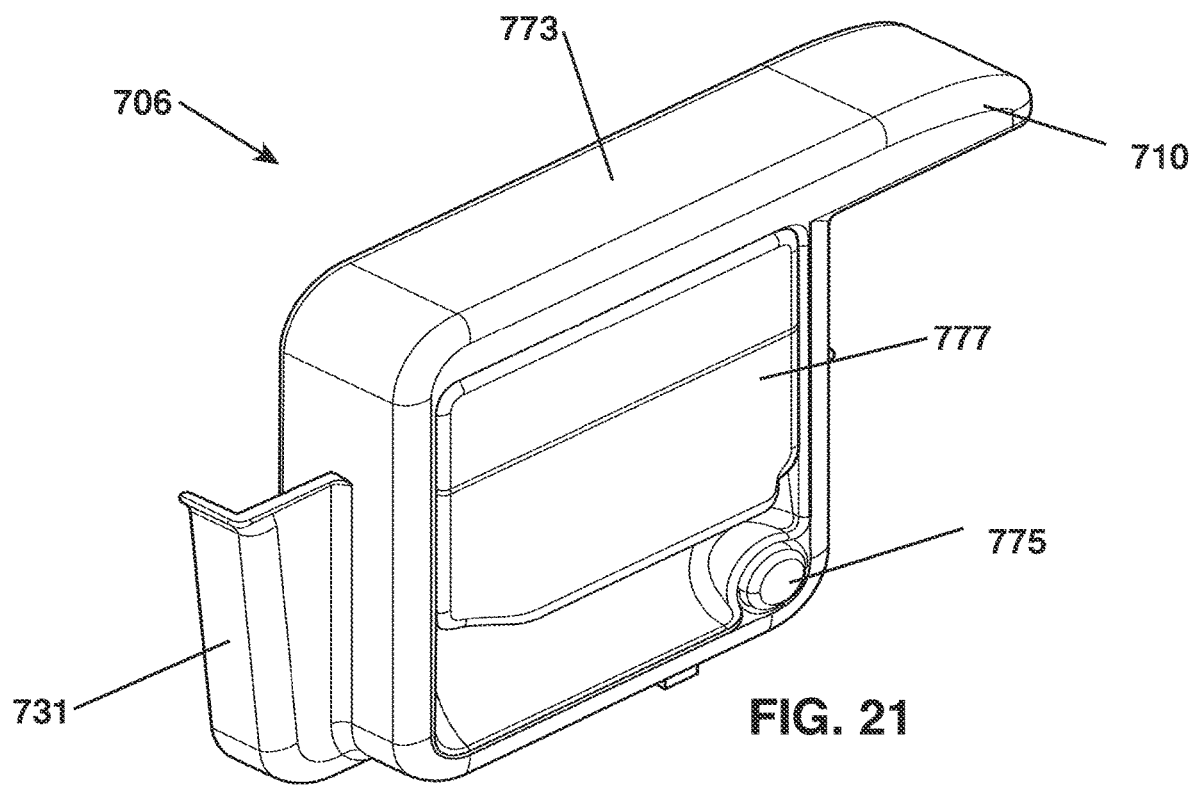
FIG. 21 is a perspective view of an example side arm assembly of the collection container system of FIG. 19.

As illustrated in FIGS. 21 and 22, each of the clamp arm assemblies 706 includes an upper clamp arm 710, a lower clamp arm 712, a housing 773, a release button 775, a lever 777, an advancement mechanism 779 (FIG. 24), and a lid holder 731 that holds the lid 735 (FIG. 36) in a convenient location that provides easy access to the lid 735. To secure the container system 700 to the work surface, the upper clamp arm 710 of each clamp arm assembly 706 is placed on an upper surface of the work surface and the lower clamp arm 712 of each side arm assembly 706 is advanced toward a bottom surface of the work surface. In particular, the lower clamp arm 712 is advanced toward the bottom surface of the work surface by repeatedly pulling the lever 777 in a direction perpendicular to the clamp arm assembly 706 until the lower clamp arm 712 makes contact with the bottom surface of the work surface. Once the container system 700 is desired to be removed from the work surface 702, the lower clamp arm 712 is moved away from the bottom of the work surface thereby releasing the container system 700 from the work surface. In particular, the lower clamp arm 712 is moved away from the bottom of the work surface by pressing the release button 775 which causes the lower clamp arm 712 to translate away from the upper clamp arm 710.

Figure 24:
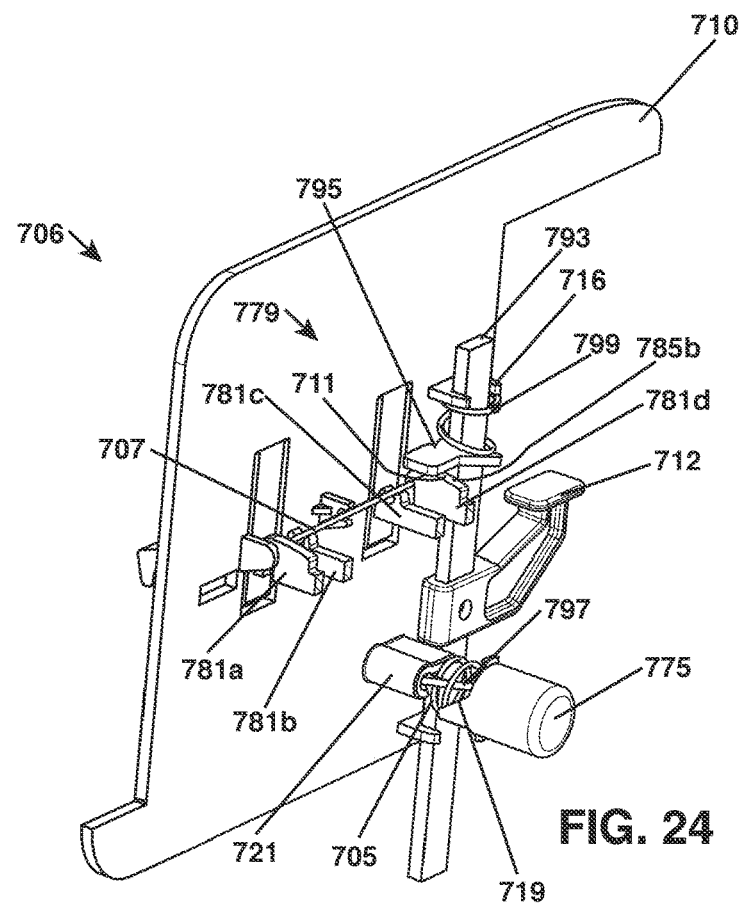
FIG. 24 is a perspective view of the example side arm assembly of FIG. 21 with various components removed.
Figure 25:
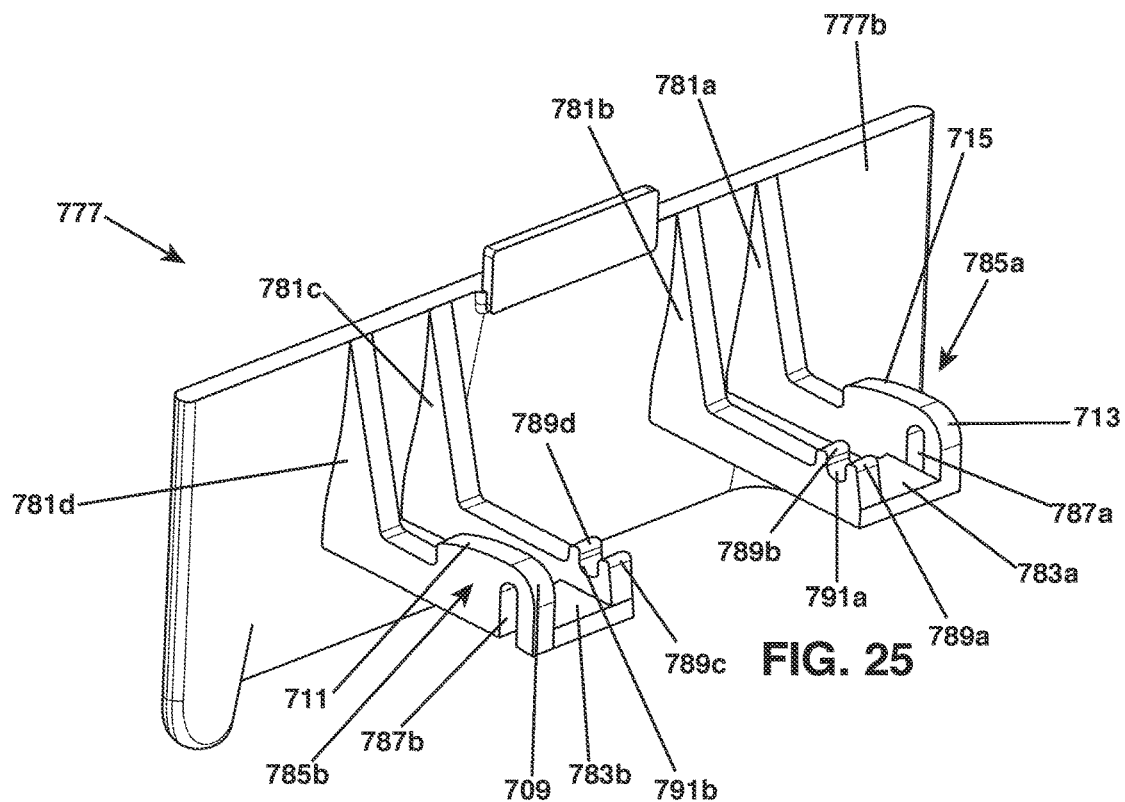
FIG. 25 is a perspective view of an example lever of the side arm assembly of FIG. 21.

FIGS. 23-26, which illustrate an example clamp arm assembly 706 with the housing 773 removed, will now be referenced as the operation of the advancement mechanism 779 is described. As best illustrated in FIG. 25, the lever 777 includes a first leg 781a, a second leg 781b, a third leg 781c, and a fourth leg 781d that extend perpendicularly from a back surface 777b of the lever 777 for a distance. In the example, the first and second legs 781a, 781b are coupled together via a first bridge 783a and the third and fourth legs 781c, 781d are coupled together via a second bridge 783b. Further, the first leg 781a includes a first cam surface 785a and a first slot 787a that extends through the first leg 781a. The second leg 781b includes a first peak 789a, a second peak 789b, and a first arcuate surface 791a that extends between the first and second peaks 789a, 789b. Similarly, the third leg 781c includes a second cam surface 785b and a second slot 787b that extends through the third leg 781c. The fourth leg 781d includes a third peak 789c, a fourth peak 789d, and a second arcuate surface 791b that extends between the third and fourth peaks 789c, 789d. In the example lever 777 illustrated in FIG. 25, the first slot 787a and the first arcuate surface 791a, and the second slot 787b and the second arcuate surface 791b are cooperatively disposed relative to one another. In particular, the first slot 787a and the first arcuate surface 791a are disposed relative to one another such that a rounded shaft can be received by the first slot 787a and the first arcuate surface 791a. Similarly, the second slot 787b and the second arcuate surface 791b are disposed relative to one another such that the rounded shaft extending between the first slot 787a and the first arcuate surface 791a extends between the second slot 787b and the second arcuate surface 791b.

Turning now to FIG. 24, which illustrates the advancement mechanism 779 of the container system 700. In the example illustrated in FIG. 24, the advancement mechanism 779 includes a shaft 793, the lower clamp arm 712 slidably disposed on the shaft 793, a first detent 795 disposed on the shaft 793, a second detent 797 disposed on the shaft 793, a first spring 799 disposed on the shaft 793 and proximate the first detent 795, a second spring 705 disposed within the release button 775, and a rod 707 passing through the first, second, third, and fourth legs 781a-781d. As discussed above, to secure the container system 700 to the work surface 702, the lower clamp arm 712 is translated toward the upper clamp arm 710 by repeatedly pulling the lever 777 (FIG. 23) in a direction perpendicularly away from the clamp arm assembly 706. Repeatedly pulling the lever 777 as such causes the lever 777 to rotate about the rod 707 because the first, second, third, and fourth legs 781a-781d slidably receive the rod 707 in respective slots and arcuate surfaces.

Further, as the lever 777 rotates about the rod 707, the cam surface 785b of the fourth leg 781d of the lever 777 interacts with the first detent 795 to cause the lower clamp arm 712 to translate towards the upper clamp arm 710. In particular, the cam surface 785b of the fourth leg 781d may include a first rounded surface 709 (FIG. 25) and a second rounded surface 711 (FIG. 25). Similarly, the cam surface 785a of the first leg 781a may include a third rounded surface 713 (FIG. 25) and a fourth rounded surface 715 (FIG. 25). In the example illustrated in FIG. 25, the first rounded surface 709 has a greater curvature than a curvature of the second rounded surface 711. So configured, the second rounded surface 711 causes the first detent 795 to translate vertically, which, in turn, causes the shaft 793 to translate vertically bringing the lower clamp arm 712 toward the upper clamp arm 710.

Specifically, as illustrated in the example side arm assembly of FIG. 24, the first detent 795 is disposed on the shaft 793 between the fourth leg 781d and a first stopper 716. The first spring 799 is disposed around the shaft 793 and between the first detent 795 and the first stopper 716. The first spring 799 abuts the first stopper 716 and, because the first spring 799 is so configured, the first spring 799 provides a continuous down force on the first detent 795. The constant down force provided by the first spring 799 on the first detent 795 causes an inner surface of an aperture, through which the shaft 793 is received in the first detent 795, to be in continuous contact with the shaft 793. Accordingly, the shaft 793 translates vertically as the first detent 795 moves vertically in response to following the first and second rounded surfaces 709, 711 because the first spring 799 allows the first detent 795 to securely retain the shaft 793 as the first detent 795 translates vertically. Thus, repeated rotation of the lever 777 incrementally brings the lower clamp arm 712 toward the upper clamp arm 710 until the container system 700 is secured to the work surface. Once the container system 700 is no longer needed, a user may remove the container system 700 from the work surface by pressing the release button 775.

Figure 26:
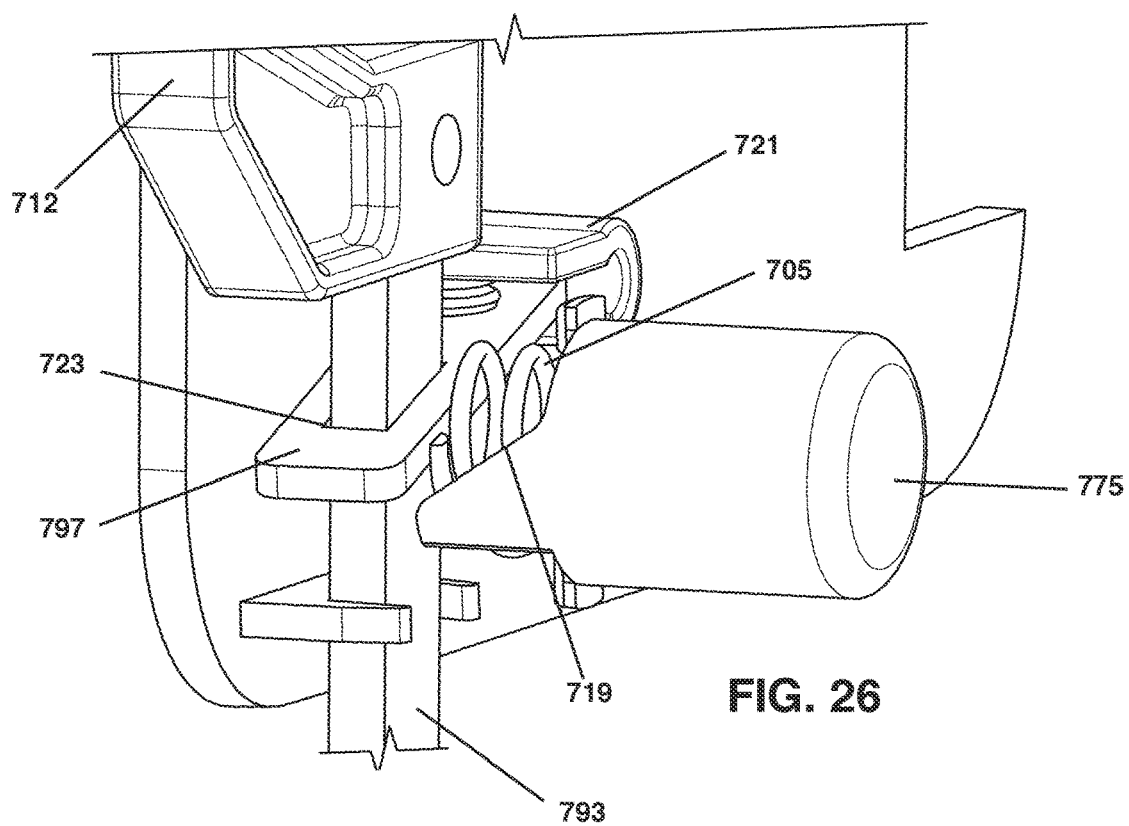
FIG. 26 is a detailed view of an example release mechanism of the side arm assembly of FIG. 21.

Turning to FIG. 26, similar to the first detent 795, the second detent 797 prevents vertical movement and, in particular, prevents the shaft 793 from sliding downwardly after the lower clamp arm 712 is moved incrementally, as discussed above. Additionally, unlike the first detent 795, the second detent 797 allows the lower clamp arm 712 to move away from the upper clamp arm 710 once the release button 775 is pressed. In particular, pressing the release button 775 brings a ramped surface 719 into contact with the second detent 797. As the release button 775 is depressed further, the second detent 797 follows the ramped surface 719 causing the second detent 797 to rotate upwardly about a pivotal structure 721 and be substantially perpendicular to the shaft 793. The second detent 797 being substantially perpendicular to the shaft 793 allows the shaft 793 to pass through an aperture 723 of the second detent 797 thereby causing the lower clamp arm 712 to move away from the upper clamp arm 710.

Figure 27:
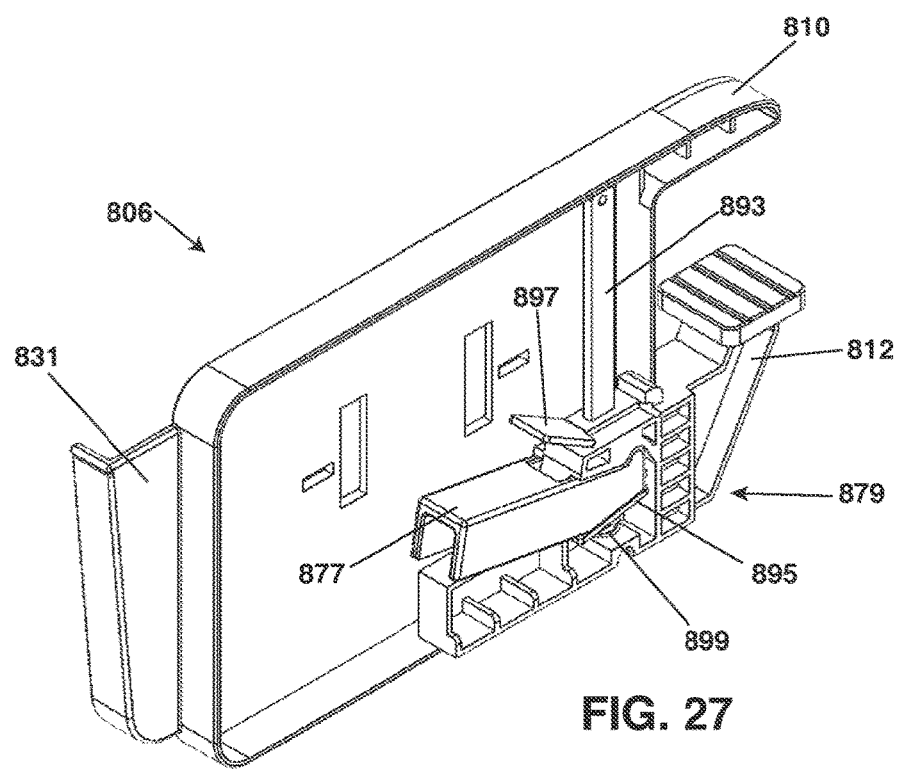
FIG. 27 is a perspective view of another example side arm assembly, constructed in accordance with the principles of the present disclosure.
Figure 28:
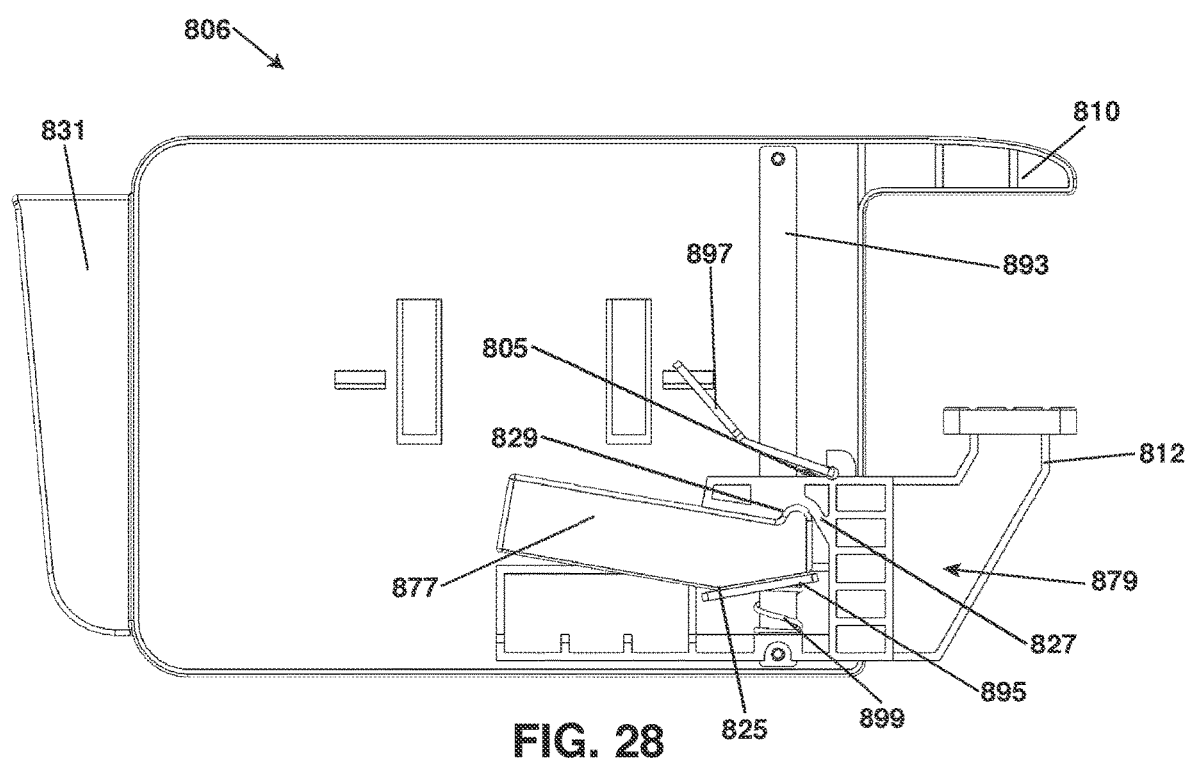
FIG. 28 is a side view of the example side arm assembly of FIG. 27.
Figure 29:
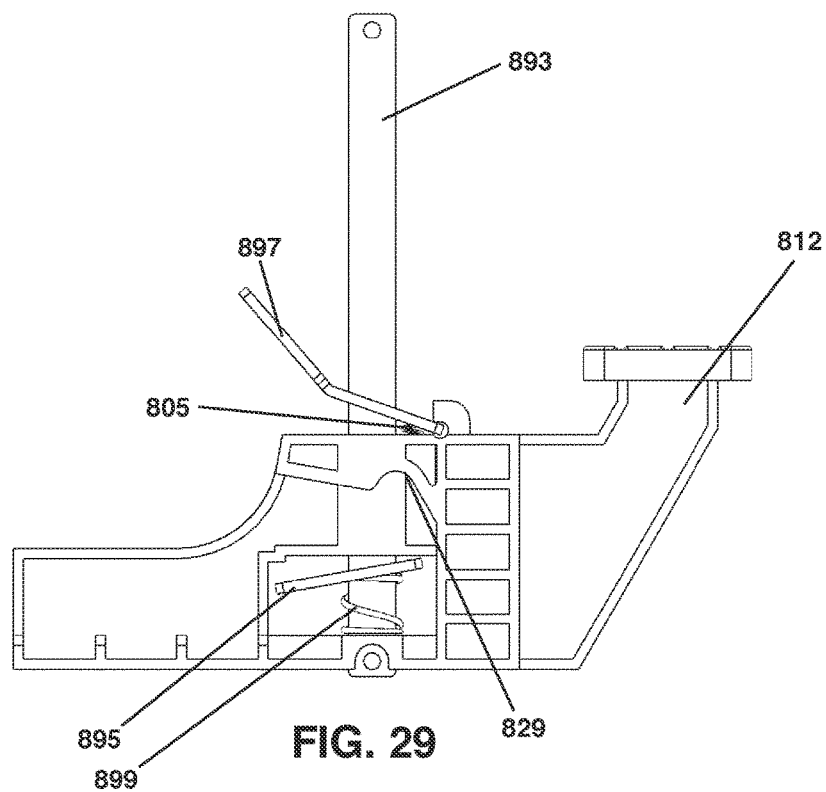
FIG. 29 is a side view of the example side arm assembly of FIG. 28 with various components removed.

FIGS. 27-29 illustrate another exemplary clamp arm assembly 806 constructed in accordance with the teachings of the present disclosure. The clamp arm assembly 806 is similar to the clamp arm assembly 706 of FIGS. 21-26, except the clamp arm assembly 806 includes a different advancement mechanism 879. Thus, for ease of reference, and to the extent possible, the same or similar components of the clamp arm assembly 806 will retain the same reference numbers as outlined above with respect to the clamp arm assembly 706 of FIGS. 21-26, although the reference numbers will be increased by 100.

Unlike the clamp arm assemblies 706 described above, the clamp arm assembly 806 includes a lever 877 that is actuated by pressing downwardly rather than pulling perpendicularly away from the clamp arm assembly like the clamp arm assembly 706. As illustrated in FIG. 27, the clamp arm assembly 806 includes an upper clamp arm 810, a lower clamp arm 812, a second detent 897, the lever 877, a shaft 893, an advancement mechanism 879, and a lid holder 831. In particular, in the example, the lower clamp arm 812 is brought toward the upper clamp arm 810 by repeatedly depressing the lever 877 causing the lower clamp arm 812 to incrementally advance toward the upper clamp arm 810.

As best illustrated in FIG. 28, the example advancement mechanism 879 includes the lever 877, a first detent 895 disposed on the shaft 893 and below the lever 877, a spring 899 disposed around the shaft 893 and between the first detent 895 and the lower clamp arm 812, and a second detent 897 disposed on the shaft 893 and on the lower clamp arm 812. The lever 877 further includes a pivot 825 and a ridge 827. The pivot 825 rests on the first detent 895 and allows the lever 877 to rotate about the point of contact between the pivot 825 and the first detent 895. In such an example, the lever 877 rotates counter-clockwise causing the ridge 827 to move upwardly in a substantially vertical direction while the end of the lever 877, opposite the ridge 827, moves downwardly in a substantially vertical direction. The ridge 827 of the lever 877 is disposed in an arcuate channel 829 of the lower clamp arm 812, which affords the ridge 827 some movement within the arcuate channel 829, i.e., similar to a ball and socket joint. Moreover, the first detent 895 is angled such that edges of an aperture (not shown) within the first detent 895 press against the shaft 893 thereby limiting movement of the lower clamp arm 812 relative to the shaft 893. Similarly, the edges of the aperture (not shown) of the first detent 895 prevent the first detent 895 from sliding downwardly relative to the shaft 893 when the lever 877 rotates about the pivot 825. So constructed, the first detent 895 remains stationary while the lever 877 is actuated causing the lower clamp arm 812 to move incrementally toward the upper clamp arm 810.

In particular, as the lever 877 is actuated, the lever 877 rotates about the pivot 825 and causes the ridge 827 to exert an upward force on the lower clamp arm 812. This upward force causes the lower clamp arm 812 to move vertically relative to the shaft 893. The upward force, however, causes the lower clamp arm 812 to move because the first detent 895 remains stationary during actuation while the lower clamp arm 812 moves relative to the first detent 895 along the shaft 893. Once the lever 877 is fully actuated, the bottom of the lower clamp arm 812 compresses the spring 899 and upon release of the lever 877, the spring 899 expands and returns to a resting state. During expansion of the spring 899, the first detent 895 translates upwardly relative to the shaft 893 and the lower clamp arm 812 until the spring 899 returns to the resting state illustrated in FIG. 29. The lever 877 is actuated continuously until the lower clamp arm 812 securely engages the bottom of the work surface thereby securing the container system to the work surface.

To release the container system from the working surface, the lower clamp arm 812 is translated away from the upper clamp arm 810. In particular, the second detent 897 prevents downward movement of the lower clamp arm 812 relative to the shaft 893 because a second spring 805 biases the second detent 897 relative to the shaft 893, such that the second detent 897 engages the shaft 893. As shown, the second spring 805 may be a compression spring that biases the second detent 897 to an angled configuration relative to the shaft 893. Accordingly, to translate the lower clamp arm 812 away from the working surface, an end of the second detent 897 is pressed downwardly causing the second detent 897 to compress the second spring 805 between the second detent 897 and a surface of the lower clamp arm 812. An opposite end of the second detent 897 is held in position by a portion of the lower clamp arm 812, such that the portion of the second detent 897 engaging the shaft 893 can be manipulated to extend substantially perpendicular to the shaft 893 thereby moving the second detent 897 out of engagement with the shaft 893. The slight downward movement may also cause the lower clamp arm 812 to translate downward slightly. The slight downward movement of the lower clamp arm 812 causes the first detent 895 to also be substantially perpendicular to the shaft 893. Once substantially perpendicular, the edges of the aperture (not shown) of the first detent 895 are no longer in contact with the shaft 893, which allows the lower clamp arm 812 to translate relative to the shaft 893 without the first detent 895 preventing such movement.

Figure 31:
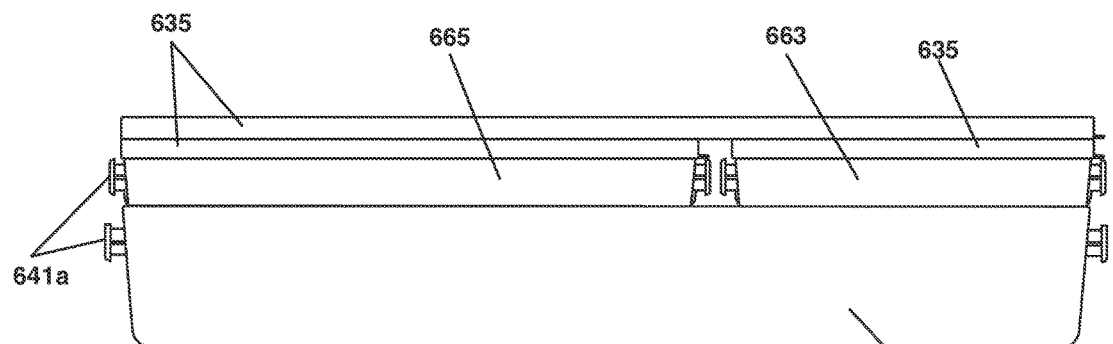
FIG. 31 is a side view of the collection containers of FIG. 30.
Figure 32:
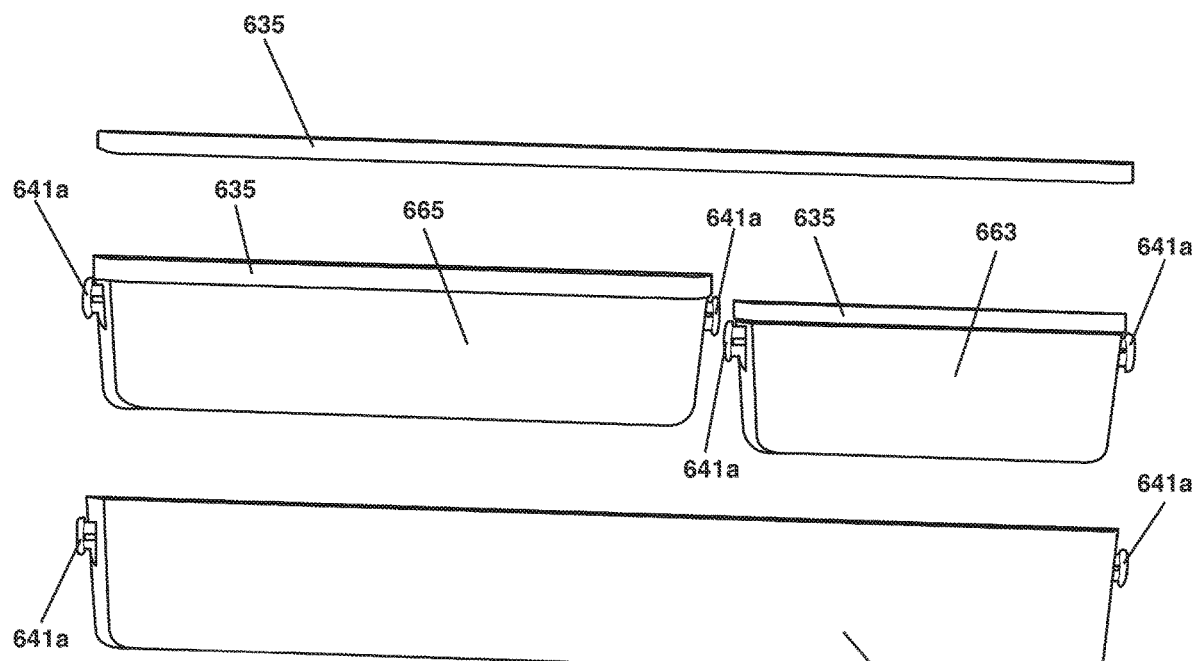
FIG. 32 is an exploded view of the collection containers of FIG. 30.
Figure 33:
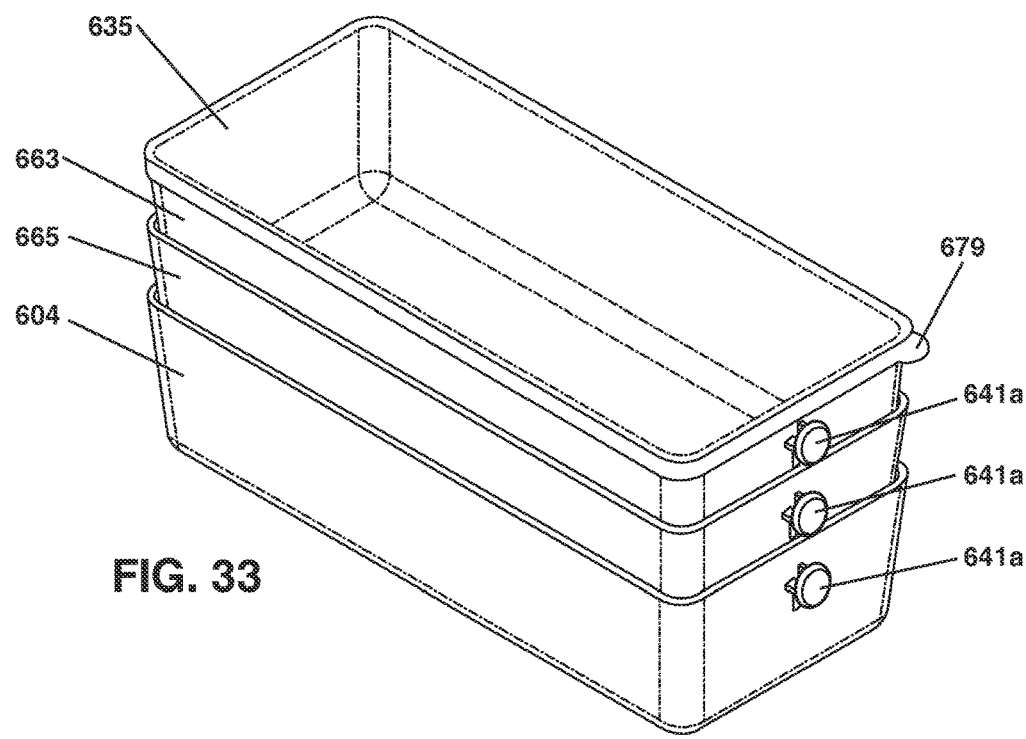
FIG. 33 is a perspective view of another example of multiple collection containers stacked within the example container of FIG. 30, constructed in accordance with the principles of the present disclosure.
Figure 34:
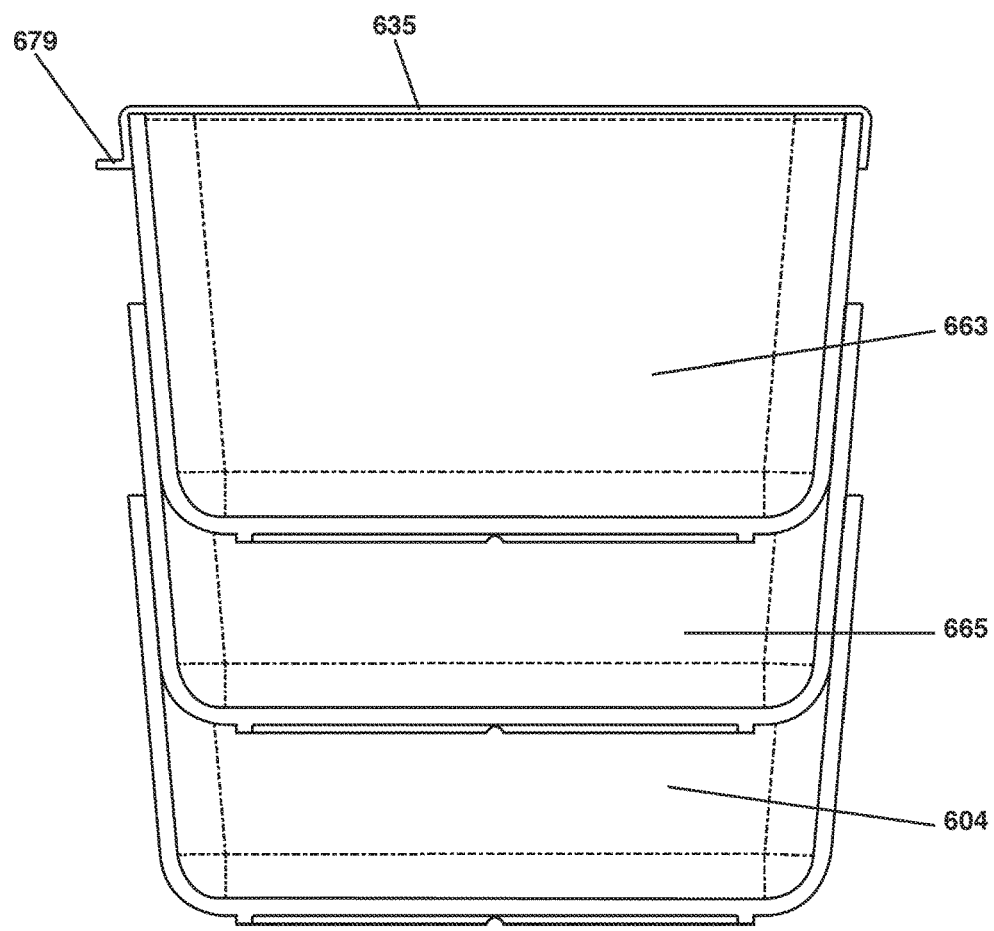
FIG. 34 is a cross-sectional, side view of the multiple collection containers of FIG. 33.

Additionally, as shown in FIGS. 30-37, the container system 600, 700 can be provided with multiple container portions 604, 704, which have varying shapes and sizes, to provide a user with a variety of receptacles suited for particular tasks. Moreover, the container portions 604 can be configured to conveniently nest within one another to provide a compact storage configuration. In one example, such as the example illustrated in FIGS. 30-35, the container system 600 can include multiple additional container portions 663, 665. Of course, the container system 600 can also be provided with additional container portions 604 that have the same size and shape, as shown in FIG. 33-35. Further, the container portions 604 includes key protrusions 647 on opposing sides thereof to ensure that an adequate distance is maintained between the nested container portions 604 so that the container portions 604 can be easily separated after storage. Moreover, the key protrusions 647 can also allow the stacked container portions 604 to be used to store food or other items in the internal receiving volume 608 without being damaged or smashed. The key protrusions 647 may take any shape that limits the depth of which the stacked container portions 604 sit within the internal receiving volume 608 of an adjacent container portion 604. The key protrusion 647, as illustrated in FIG. 35, can be provided at any desired height along the sidewalls 604d, 604e to contact the top edge 604f of the adjacent container portion 604 and be fixed at a specific depth in the internal receiving portion 608 of the adjacent container portion 604. Additionally, while not illustrated, the container portions 604, 704 may include marking to indicate a liquid item disposed within the container portion. For example, the container portions 604, 704 can include a plurality of lines on a side 604a-604e, 704a-704e of the container portion 604, 704 indicating the volume of liquid disposed within the container portion 604, 704.

Figure 19:
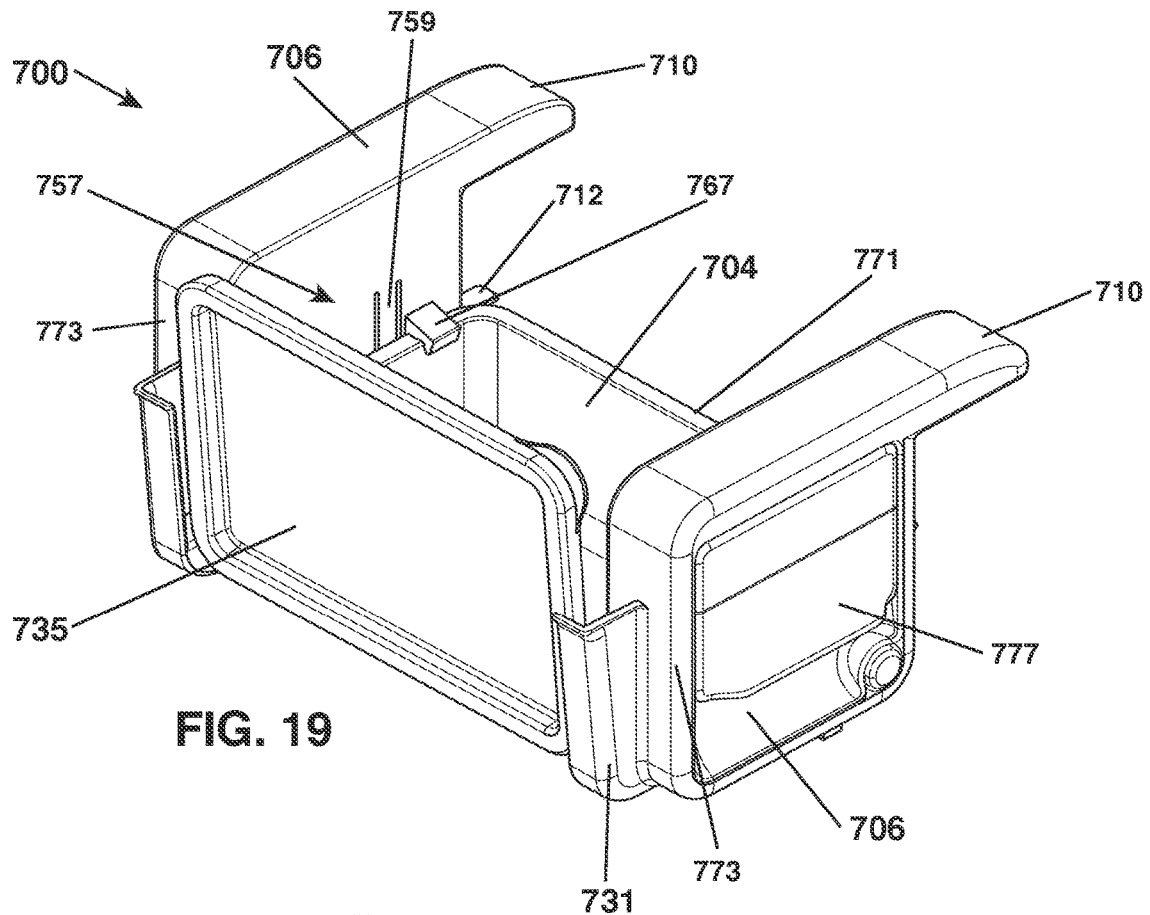
FIG. 19 is a rear perspective view of another embodiment of a collection container system, constructed in accordance with the principles of the present disclosure.
Figure 20:
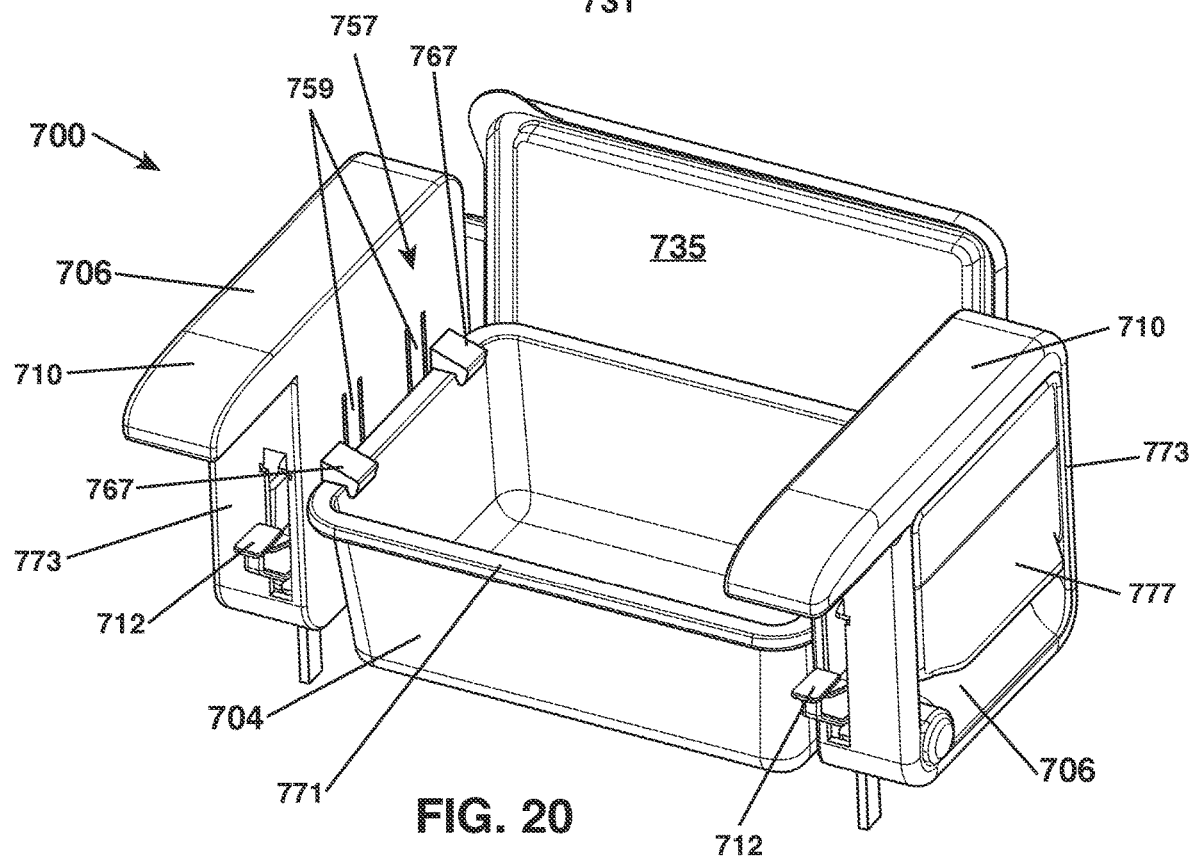
FIG. 20 is a front perspective view of the collection container system of FIG. 19.
Figure 36:
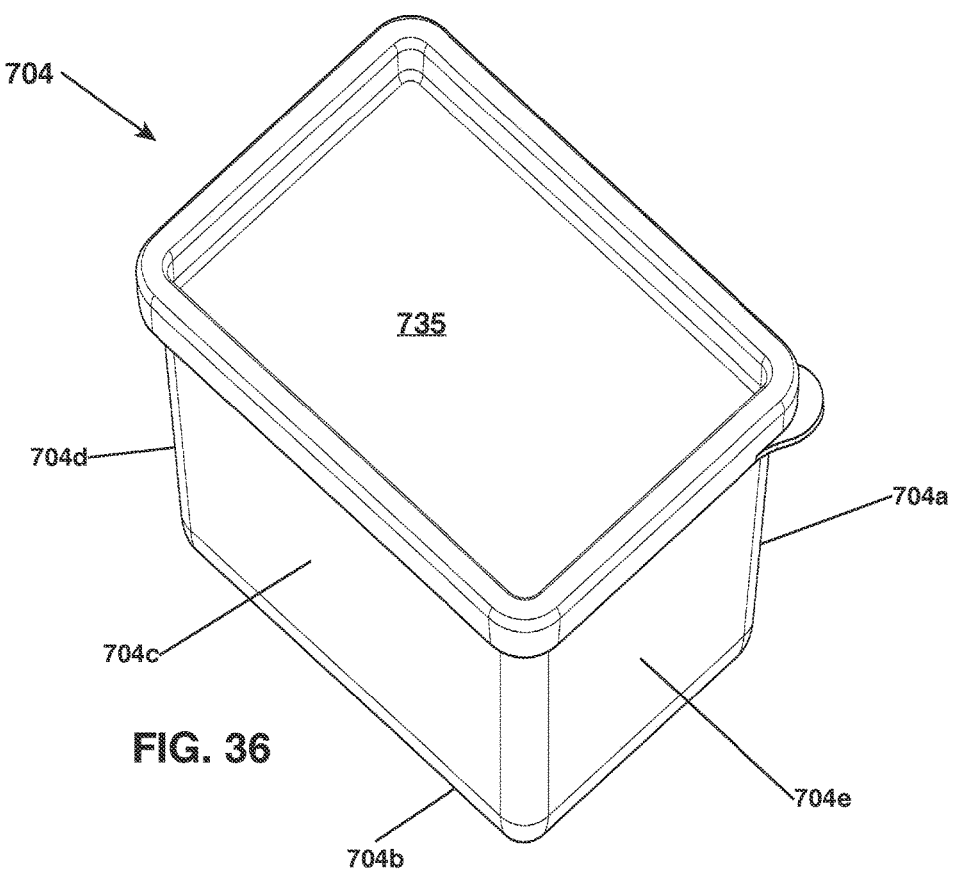
FIG. 36 is a perspective view of another example container, constructed in accordance with the principles of the present disclosure, used with the container system of FIG. 19.
Figure 37:
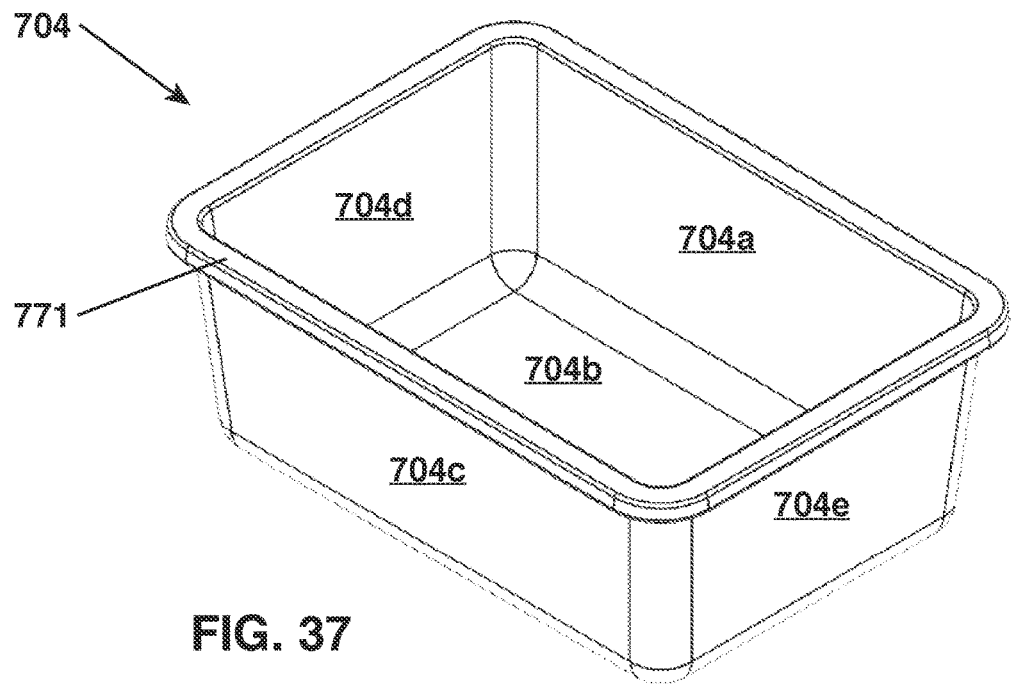
FIG. 37 is a perspective view of the example container of FIG. 36.

FIGS. 36 and 37 illustrate another example container portion 704 that can be used with the container system 700 of FIGS. 19 and 20. Similar to the container portions 605, 663, 665, the container portion 704 includes a front wall 704a, a bottom wall 704b, a rear wall 704c, a first side wall 704d, and a second side wall 704e. Additionally, the container portion 704 includes an upper lip 771 (FIG. 37) that is configured to interact with the tab 759 and projection 761 of the locking mechanism 757 (FIG. 20) to secure the clamp arm assemblies 706 to the container portion 704. Moreover, the container portion 704 also includes a lid 735 that seals the container portion 704. The lid 735 may also be stored in the lid holder 731, as illustrated in FIG. 19.

Figure 30:
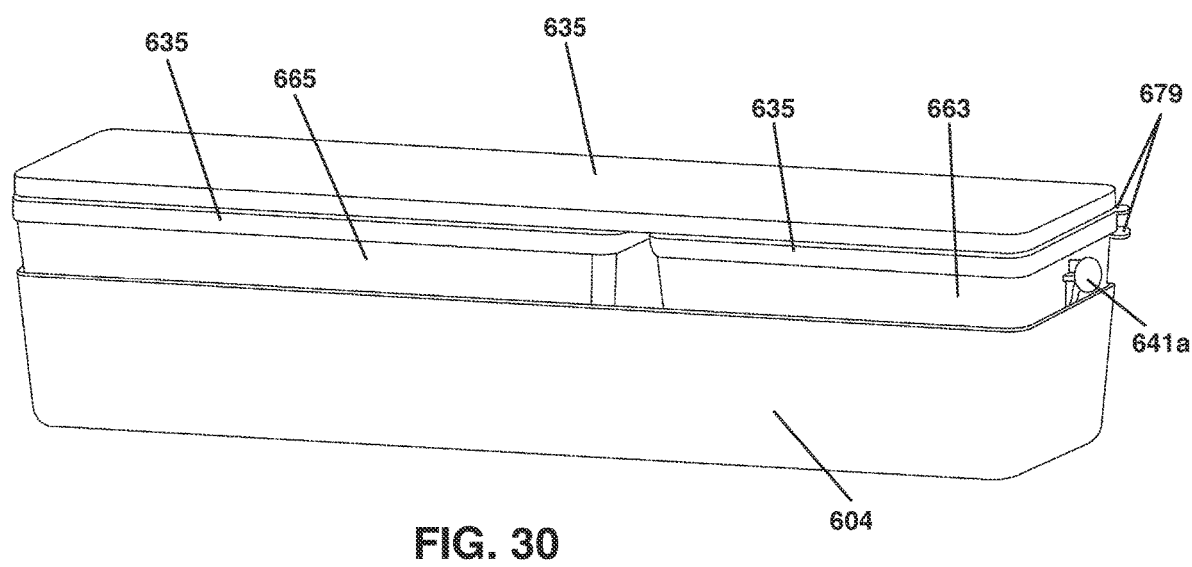
FIG. 30 is a perspective view of multiple collection containers stacked within the example container of FIG. 15, constructed in accordance with the principles of the present disclosure.
Figure 38:
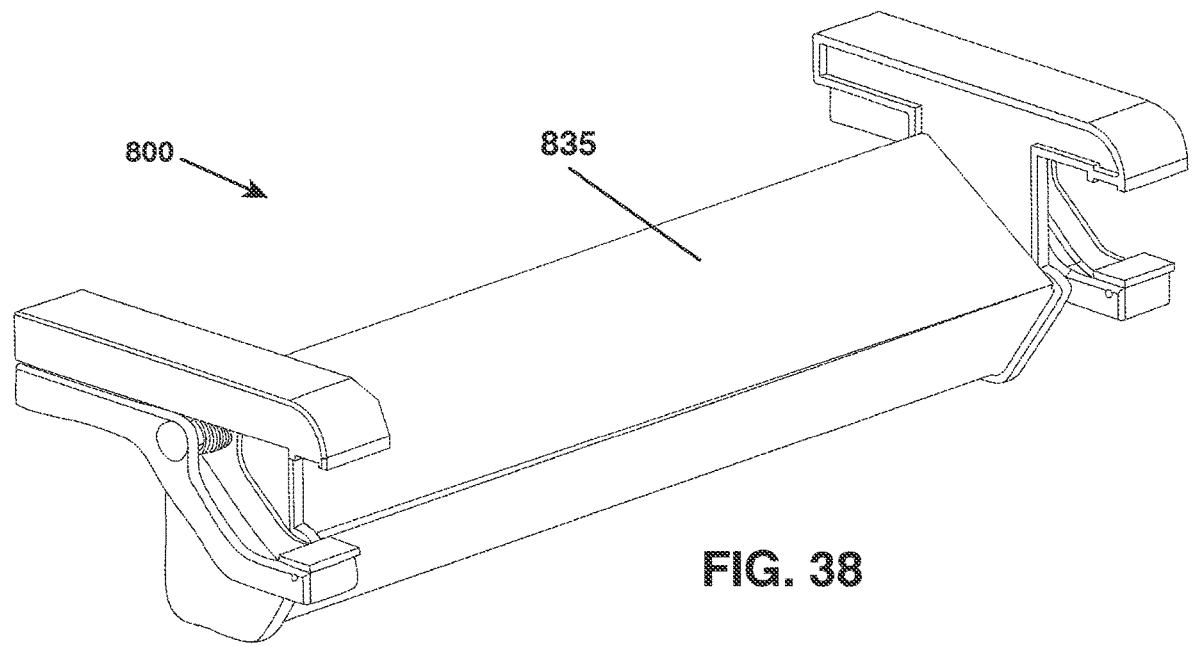
FIG. 38 is a perspective view of the example collection container system of FIG. 36 with an example of a lid.
Figure 39:
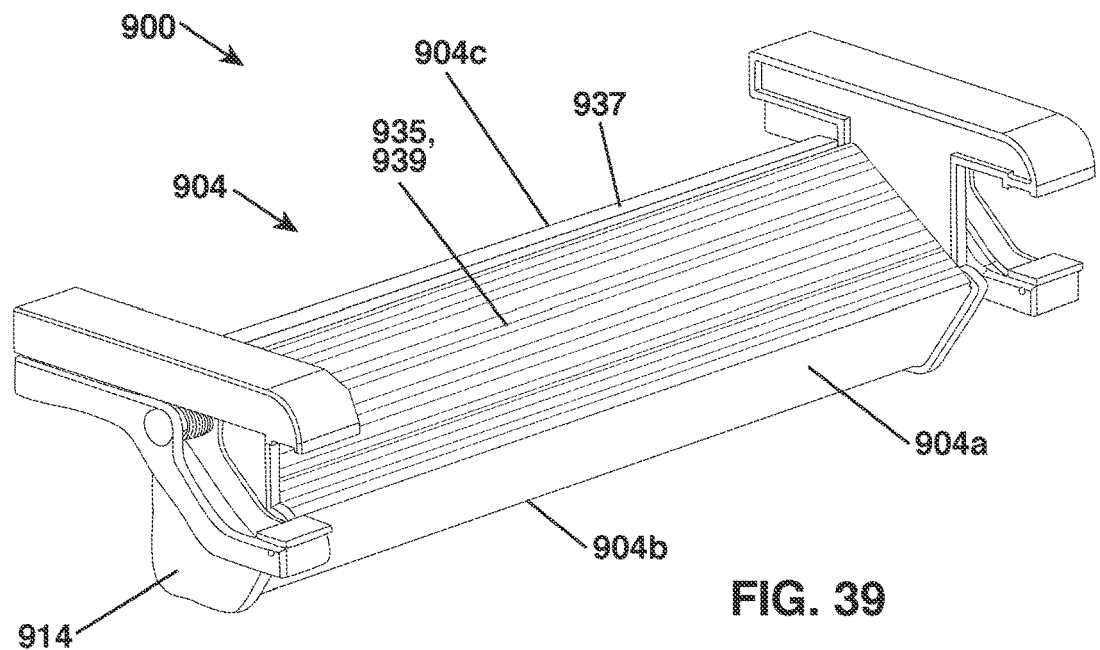
FIG. 39 is a perspective view of the example collection container system with another example of a lid, constructed in accordance with the principles of the present disclosure.

While the container portion 104 has been illustrated in the figures as including an open receiving volume 108, other versions of the systems provided herein, such as the container system 800 in FIG. 38, the container system 900 depicted in FIG. 39, and the system 600 depicted in FIGS. 30 and 31, can include a lid 135, 635, 735 for selectively closing the container portion 104, 604, 904. The inclusion of a lid 135, 635, 935 could be useful to prevent debris stored in the container portion 104, 604, 904 from attracting insects, or it could be useful when the container portion 104, 604, 904 is being used as a food storage container to keep the contents fresh or to prevent spilling during transport of the container portion 104, 604, 904 of system 100, 600, 900. For example, the lid could be attached to a portion, such as the rear wall of the container portion, via a first securing mechanism and attached to another portion, such as the front wall of the container portion, via a second securing mechanism. In such an example, the first securing mechanism could be a hinge and the second securing mechanism could be a clasp latch to sealingly attach the lid to the container portion. The first and second securing mechanisms may take other forms in different examples, such as, a friction fit securing mechanism, a tongue and groove securing mechanism, a hook and loop fastener, a magnet, or any combination thereof. In other examples, the lid could be completely separate, similar to conventional plastic storage container lids. In other examples, the lid 635 can cover the separated container portion 604 as illustrated in FIGS. 30-32. In such an example, the lid 635 releasably couples to the container portion 604 via a tongue and groove and includes a tab 679 that aids in removal of the lid 635 from the container portion 604. The lid 635 can also include, in some examples, a sealing gasket (not shown) to prevent moisture and air from entering the internal receiving portion 608 of the container portion 604. The sealing gasket can be made of, for example, a rubber or other synthetic material.

In yet other examples, the lid 935 could take the form of a shutter 939 having a plurality of slats pivotably coupled together. The shutter 939 can be attached to a portion, such as the rear wall 904c of the container portion 904, via, for example, a housing 937. In a first example, the shutter 939 can be disposed on a portion of the rear wall 904c. As depicted in FIG. 39, the shutter 939 may be rolled into a housing 937 disposed on a portion of the rear wall 904c, when not in use. To close the shutter 939 and secure the contents within the container portion 904, in one example, the shutter 939 could be manually pulled from the housing 937 and releasably attached to a portion of the front wall 904a. In another example, the sidewall plate 914 can include a shutter guide (not shown) that extends from the rear wall 904c to the front wall 904a and receives the shutter 939. In such an example, to close the shutter, the shutter can be manually pulled from the housing 937 and secured to the front wall 904a. In other examples, the shutter 939 may be closed using a lever mechanism, a crank mechanism, or a ratchet mechanism. In additional examples, the shutter 939 can be stored within a portion of the container portion 904. In particular, the shutter 939 may be stored within one of the walls 904a, 904b, 904c of the container portion 904. For example, one of the walls 904a, 904b, 904c may be hollow and adapted to receive the shutter 939. In such an example, the shutter 939 may have a size substantially similar to the size of the hollow wall 904a, 904b, 904c such that a portion of the shutter could be disposed within the wall 904a, 904b, 904c and a portion of the shutter 939 could extend past the wall 904a, 904b, 904c and be held in place by, for example, a holder. In other examples, a housing may be disposed within the hollow wall 904a, 904b, 904c and adapted to receive the shutter and, in particular, roll the shutter 939 into the form of a cylinder when disposed within the housing. In such an example, a portion of the shutter could extend past the wall 904a, 904b, 904c and be held in place by, for example, a holder.

Once the shutter 939 is pulled from the housing 937 to cover the container portion 904 of the system 900, the shutter 939 may be secured to a portion, such as the front wall 904a of the container portion 904, via a second securing mechanism. For example, the shutter 939 could be secured to the front wall 904a of the container portion 904 using a clasp latch. The second securing mechanism may take other forms in different examples, such as a friction fit securing mechanism, a tongue and groove securing mechanism, a hook and loop fastener, a magnet, or any combination thereof.

Further, the shutter 939 may include a seal to ensure the receiving volume 908 of the container portion 904 is sealed from the elements. For example, a distal end of the shutter can include a hermetic seal keeping the receiving volume airtight. In other examples, the distal end of the shutter 939 can include a watertight seal, which can keep food stored within the receiving volume safe from moisture and reduce the possibility of mold forming within the receiving volume. The shutter guide may also include a seal (e.g., hermetic seal, watertight seal, etc.) to ensure the entire container portion 904 is sealed from the elements and the contents within the receiving volume are protected.

Figure 40:
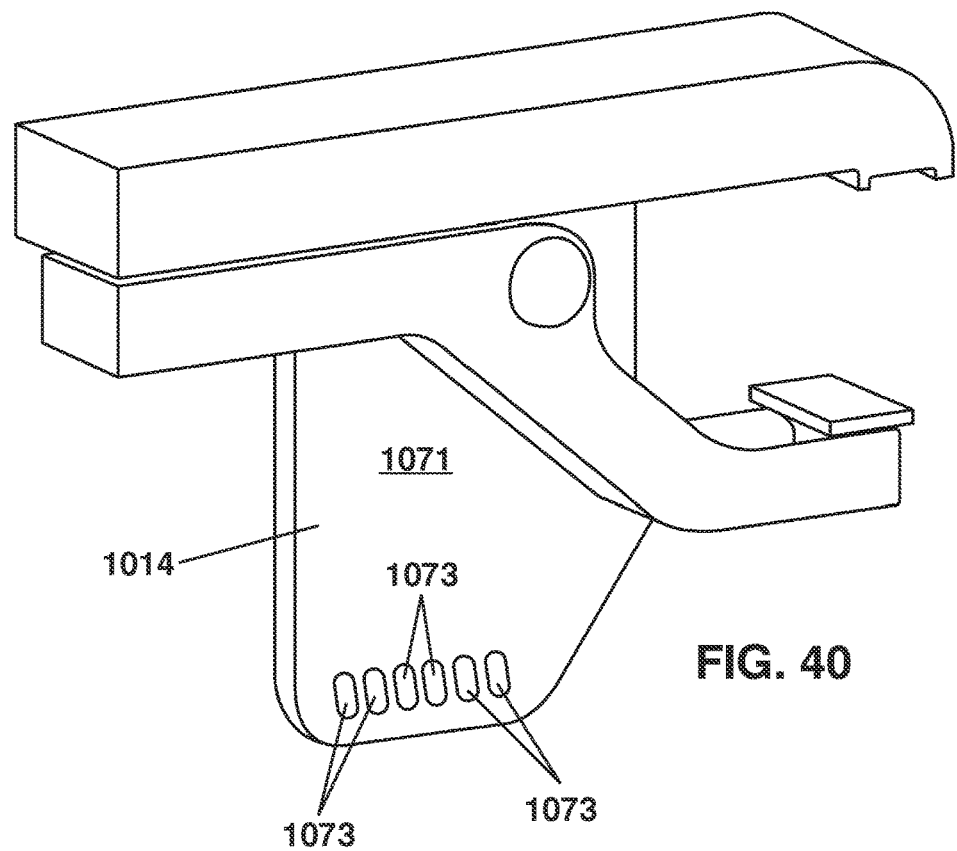
FIG. 40 is a perspective view of another version of the clamp arm assembly of the collection container system of FIG. 1, constructed in accordance with the principles of the present disclosure.

The container portion in some versions could include at least one perforated wall 1071 for the passage of fluids, such as the example illustrated in FIG. 40. This could be useful in situations where the system is positioned on a work surface located over a floor drain or sink drain, for example, such that it is desirable to only collect solid materials in the container portion. In particular, in some examples, the at least one perforated wall 1071 can include at least one slot 1073. The at least one slot 1073 may take the form of various shapes and sizes depending on the application of the system. For example, the at least one slot 1073 could be a circular, rectangular, triangular, elliptical, etc. aperture in a portion of the container portion (e.g., the front wall, the bottom wall, the rear wall, or the sidewall plates 1014, etc.). For example, as depicted in FIGS. 40 and 41, the at least one slot 1073 could be disposed on the lower portion of the sidewall plate 1014.

Figure 41:
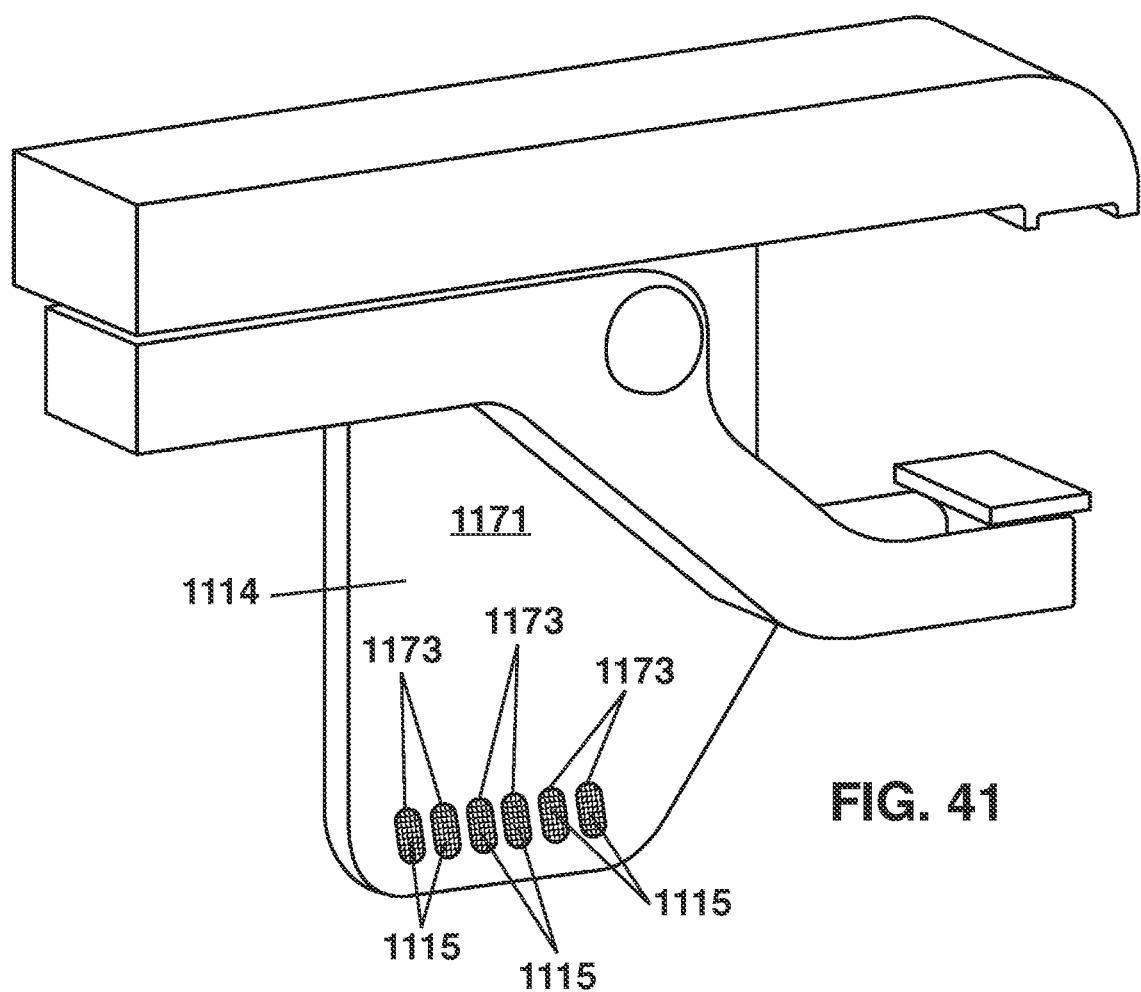
FIG. 41 is a perspective view of another version of the clamp arm assembly of the collection container system of FIG. 1, constructed in accordance with the principles of the present disclosure.

In some examples, such as the example illustrated in FIG. 41, the sidewall plates 1114 could include a screen 1115 for selectively permitting or restricting passage of fluids and/or solid items through the at least one perforated wall 1171. In particular, the screen may be disposed within the portion of the container portion that includes the at least one slot 1173. For example, as depicted in FIG. 41, the screen 1115 could be disposed in the sidewall plate 1114 and selectively permit or restrict passage of fluids and/or solid items through the slot 1173. In some examples, the screen 1115 could take the form of a mesh screen with pores sized to permit the flow of fluid through the at least one slot 1173, but restrict the flow of solid objects through the at least one screen. In other examples, the screen 1115 could include a first layer and a second layer such that the first and second layers could be moved into fluid communication with the at least one slot 1173 and moved out of fluid communication with the at least one slot 1173. The first layer may take the form of a mesh screen with pores sized to permit the flow of fluid through the at least one slot 1173 and the second layer may take the form of a solid wall that fluidly seals the at least one slot 1173. In such an example, the first and second layers of the screen 1115 could be used in conjunction to serve multiple purposes in the preparation for food. For example, food may be chopped and placed into the container portion. Once chopped, it may be desirable to rinse the chopped food while in the container portion. In such an example, the first and the second layers of the screen 1115 could be moved into engagement with the at least one slot and then the container portion could be filled with water or other liquid to rinse the chopped food. Once the food is rinsed, the water may be drained from the container portion by moving the second layer of the screen out of engagement with the at least one slot 1173, which allows the water or other liquid to drain from the container portion while the first layer of the screen prevents the shopped food from leaving the container portion through the at least one slot. It will be readily understood that any of the container portions described herein can be modified to include the drainage features described above.

In some versions, the container portions provided herein could include one or more insulated walls, which, in combination with a lid, could help keep the contents of the container portion cold and fresh. For example, the walls of the container portion could be double walled and vacuum sealed to insulate the contents placed within the container portion. Additionally, in other examples, the container portion could include a slot disposed within the receiving volume adapted to receive a cooling device or a heating device. The cooling device may be an instant ice pack, a gel ice pack, etc. and the heating device may be an instant hot pack, a rechargeable heating pad, etc. In such an example, the cooling or heating device disposed within the receiving volume of the container portion acts in conjunction with the insulated walls to maintain the contents at a cooler temperature or a warmer temperature, respectively.

Additionally, a heating and cooling element may be disposed within the walls of the container portion. For example, the heating and cooling element could be a heating and cooling coil that runs through the walls of the container portion. The heating and cooling coil may be coupled to a heating source or a cooling source depending on whether the contents stored within the receiving volume of the container portion are to be heated or cooled. In other examples, a heat transfer fluid may be placed in the walls of the container portion to surround the heating and cooling coils. In such an example, the heat transfer fluid could more evenly heat or cool the contents within the receiving volume of the container portion.

In still another version, the systems described thus far could be part of a larger kit or system which includes a plurality of separate container portions, each being optionally independently removably attachable to the first and second side arm assemblies. Thus, users could have additional container portions for storing food, or for using to clean up debris while other container portions are being cleaned or used for other tasks.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A collection system for removable attachment to a worktop, the collection system comprising:
   a container portion having an interior defined by a bottom wall, a front wall, a back wall, a first side wall, a second side wall, and a lip that extends around a top edge of the container portion; and
   a first clamp arm assembly carried by the first side wall and a second clamp arm assembly carried by the second side wall;
   wherein each of the first and second clamp arm assemblies comprises:
      an upper clamp arm; and
      a lower clamp arm attached to a lever having a pivot and a ridge, wherein:
         a first detent is disposed on a shaft and below the lever;
         a spring is disposed around the shaft and between the first detent and the lower clamp arm;
         a second detent is disposed on the shaft and on the lower clamp arm;
         the pivot rests on the first detent and allows the lever to rotate about a point of contact between the pivot and the first detent;
         the ridge is disposed in an arcuate channel of the lower clamp arm; and
         a movement of the lever translates the lower clamp arm toward the upper clamp arm.

2. The collection system of claim 1, wherein a rotational movement of the lever causes the lower clamp arm to translate toward the upper clamp arm.

3. The collection system of claim 2, wherein the lever is actuated by pressing downward on the lever.

4. The collection system of claim 1, wherein rotation of the lever about the pivot causes the ridge to translate vertically and advance the lower clamp arm toward the upper clamp arm.

5. The collection system of claim 1, further comprising a second spring biasing the second detent relative to the shaft to engage the shaft.

6. The collection system of claim 1, further comprising multiple sub-container portions, wherein each of the multiple sub-container portions has a different shape or size.

7. The collection system of claim 1, wherein the first and second side walls of the container portion each include a first portion; and each of the first and second clamp arm assemblies includes a second portion that is configured to releasably engage the first portion.

* * * * *